INVENTOR
Fred G Parsons

Nov. 30, 1943.  F. A. PARSONS  2,335,304
PATTERN CONTROLLED COPYING MACHINE
Filed May 18, 1942  6 Sheets-Sheet 3

INVENTOR
Fred A Parsons

Nov. 30, 1943.    F. A. PARSONS    2,335,304
PATTERN CONTROLLED COPYING MACHINE
Filed May 18, 1942    6 Sheets-Sheet 4

INVENTOR
Fred A. Parsons

Nov. 30, 1943.     F. A. PARSONS     2,335,304
PATTERN CONTROLLED COPYING MACHINE
Filed May 18, 1942     6 Sheets-Sheet 5

INVENTOR
Fred G. Parsons

Nov. 30, 1943.     F. A. PARSONS     2,335,304
PATTERN CONTROLLED COPYING MACHINE
Filed May 18, 1942     6 Sheets–Sheet 6

INVENTOR
Fred A. Parsons

Patented Nov. 30, 1943

2,335,304

UNITED STATES PATENT OFFICE 2,335,304

PATTERN CONTROLLED COPYING MACHINE

Fred A. Parsons, Milwaukee, Wis., assignor to Kearney & Trecker Corporation, West Allis, Wis., a corporation of Wisconsin Application May 18, 1942, Serial No. 443,488

52 Claims. (Cl. 90—13.5)

This invention relates to machine tools and particularly for what is commonly termed automatic copying, where a tool is caused to operate on a work piece to effect a work contour corresponding to the preformed contour of a pattern or master, which operates through tracer controlled mechanism to control the relative tool and work movement.

In such machines the copying operation is usually performed by changing the relative rates of support movements in at least two mutually transverse paths, such changes operating to change the direction of tool movement effected by the combined path movements, whereby to copy the pattern form on the work piece. The tracer device traverses the pattern contour and responds to any change of the contour, such response being usually by way of a relative displacement of tracer elements. The response of the tracer device operates to control the relative rates of support movements, whereby to correct the tool travel direction, but always with an intervening interval or lag between the start of the tracer response and the completion of the direction correction. The effects of such unavoidable lag, unless prevented, limit the speed and accuracy of the copying operation.

A purpose of the invention is to provide a copying method and machine which is inherently accurate in spite of the unavoidable lag, such as mentioned, involved in all automatic copying operations.

A further purpose is to increase the traverse speed and production rate at which accurate copying can be carried out in an automatic copying machine.

A further purpose is to provide a copying method and machine by which provision is made for compensating for lag at any tool traverse rate whereby the copying can be carried out at any traverse and production rate that the machine and tool will stand.

A further purpose is to provide a method and machine by which the lag may be substantially predetermined irrespective of various factors which, in previous machines, operate to cause unpredictable variations in the lag. Where the lag is unpredictable it is not possible to wholly compensate for it, and the only other remedy is to reduce the tool traverse rate, whereby to reduce the lag error, in accordance with the degree of accuracy required.

A further purpose is to provide a copying method and machine in which relatively little or none of the power required for traversing the supports, or for removing work material to effect the desired contour, or the like, is controlled from the tracer, whereby the tracer controlled power is limited substantially to only such power as is required for overcoming the inertia of the supports resisting pattern controlled changes of rate or direction.

A further purpose is to provide a supplemental or alternative method and mechanism for substantially straight-path movement when the cutter is copying angular pattern surfaces, while preserving most or all of the advantages inherent in the primary method and machine.

A further purpose is generally to simplify and improve the construction and operation of machine tools, particularly for copying machines, and still other purposes will be apparent from this specification.

Various modifications of the structure illustrated and described are contemplated, and it is to be understood that the invention includes all modifications within the spirit and scope thereof and of the claims.

Throughout the specification the same reference characters have been used to identify the same parts, and in the drawings.

Figure 1:
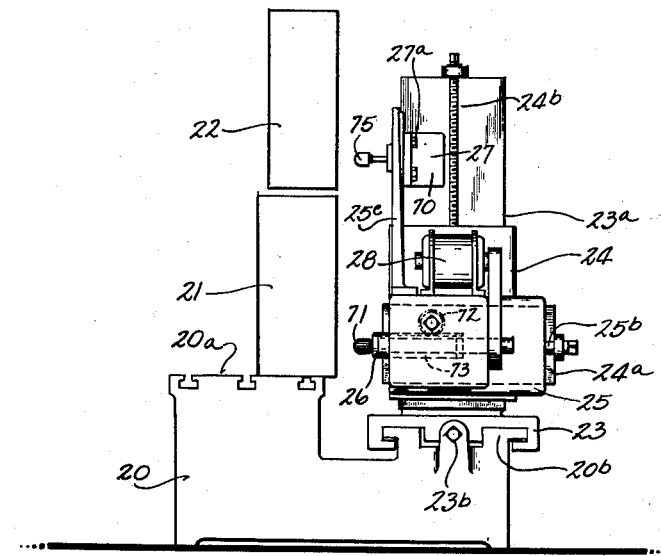
Figure 1 is a semi-diagrammatic end elevation of a copying machine incorporating the invention.

In the copying machine of Fig. 1 a base 20 provides a stationary work support or table portion 20a for carrying a work piece such as 21 and a pattern such as 22, each rigidly fixed with the support by the means of suitable fixtures and clamps, not shown. A longitudinally movable support 23 is carried by a slide portion 20b of the bed and carries a vertically movable support 24 on a slide portion 23a, the support 24 carrying a support 25 movable toward and from the pattern and work piece on a slide portion 24a. Each of the movable supports is provided with suitable screw and nut means including screws 23b, 24b, 25b, respectively for the different supports, which may each be actuated manually by suitable cranks, not shown, applied to the squared ends of the screws, or may each be power actuated by transmission mechanism later described.

The support 25 carries a rotatable tool spindle 26 and a tracer unit 27, the tracer unit being carried on an upwardly extending arm or bracket 25c fixed with the support 25, the tracer unit being guided thereon for vertical adjustment to be fixed by the means of bolts such as 27a in a predetermined vertical spacing, relative to spindle 26, corresponding to the vertical spacing of a configuration of pattern 22 relative to the desired position of a similar configuration to be effected on the work piece.

Tool spindle 26 is driven selectively at various speeds by a motor 28 carried on support 25, there being suitable means, not shown, provided for effecting the various spindle speeds, as by a control of the motor speed or by any suitable rate changer.

Figure 2:
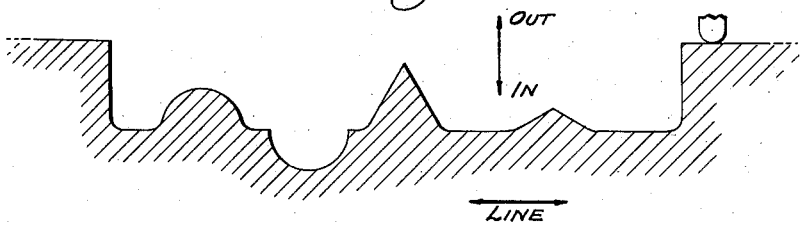
Figure 2 is a cross section of a pattern contour such as might be copied by a machine incorporating the invention.

In a machine such as shown in Fig. 1 a pattern contour such, for example, as is shown in cross section in Fig. 2, may be copied on the work piece by utilizing the movements of support 25 toward and from the pattern respectively to effect the "in" and "out" directions of movement indicated in Fig. 2. In such case the "line" path of movement, Fig. 2, might be effected either by the vertical movement of the support 24 or by the longitudinal movement of support 23. Whichever of these supports is selected for the "line" movement, the other would be provided with suitable means for effecting a "cross" movement transverse to both the "in-out" and "line" paths, such movement preferably being effected by step-by-step action at one or both ends of the "line" movement. The copying movements mentioned may be effected by any suitable arrangement of supports which will effect relative movement in three mutually transverse paths. Thus, for instance, the pattern 22 and work 21 might be bodily movable, instead of the tracer and tool, or the machine arranged for the tool spindle 26 to be vertical instead of horizontal, etc. It will therefore be understood that the transmission and control mechanism described herein may be used for any suitable arrangement and use of three movable supports, and to avoid confusion the relative support movements will be identified herein as "line," "in-out" and "cross" movements, irrespective of direction relative to the horizontal or vertical.

Figure 3:
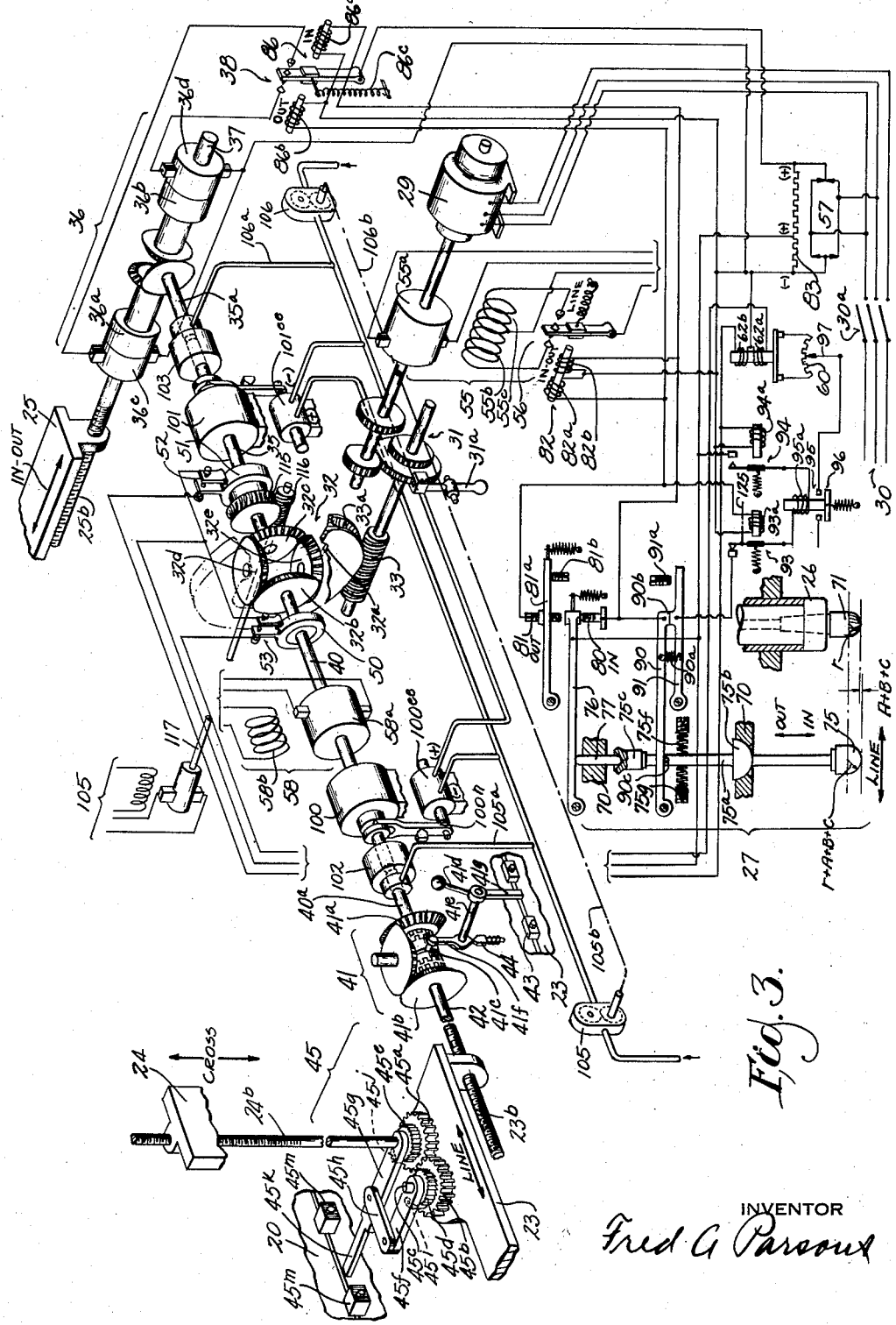
Figure 3 is a semi-diagrammatic view of a transmission mechanism for the machine of Fig. 1, together with certain of the control mechanism therefor. There is also included some special purpose transmission and control mechanism showing the relationship thereof to what may be termed the primary mechanism.

The transmission and control mechanism diagrammatically shown in Fig. 3 may be used for any suitable support arrangement, as stated. As applied herein to the machine of Fig. 1, the "line" movement, Fig. 2, is effected by the support 23, the "in-out" movement by the support 25 and the "cross" movement by the support 24, but it will be understood that the diagram of Fig. 3 does not show some of the transmission portions where used merely for connecting the essential mechanism in an arrangement to suit a selected arrangement of machine supports.

Each of the three relatively movable supports 23, 24, 25 is primarily driven from a constant speed motor 29, Fig. 3, of any suitable type as, for example, suitable to be driven from an A. C. line 30 through a main switch 30a, the motor driving through rate change means of any suitable type such as a rate changer 31 having a shiftable rate adjustment member 31a. The motor 29 drives a differential gear device 32 through a worm 33 which engages a worm wheel 33a fixed with the differential cage 32a, the cage driving output branch bevel gears 32b, 32c through bevel gears 32d, 32e which are journaled in cage 32a in the usual manner.

The "in-out" support 25 is driven from the differential output branch gear 32c through a shaft 35, a reverser 36, a shaft 37 and screw and nut means including the screw 25b. The reverser 36, as here shown, is of electro-magnetic clutch type, including oppositely running driving clutch members 36a, 36b driven from shaft 35, as through the bevel gears shown in Fig. 3, and rotatably supported on shaft 37, current being supplied and controlled for the driving clutch members through a reverser switch 38 to alternatively actuate driven clutch members 36c, 36d fixed on shaft 37. The clutch actuating current for reverser 36 is tracer controlled, as later explained, to alternatively effect opposite direction "in" or "out" coupling for driving the screw 25b.

The "line" support 23 is driven from the differential output branch gear 32b through a shaft 40, a reverser 41, a shaft 42 and screw and nut means including the screw 23b. The reverser 41, as here shown, includes a gear 41a fixed on shaft 40 and an oppositely running gear 41b rotatably supported on shaft 42, each of the gears being provided with positive clutch teeth on their inner faces. A clutch spool or member 41c is slidably splined with shaft 42 and is provided with clutch teeth at its opposite ends alternatively engageable with the clutch teeth of the gears 41a or 41b, whereby to selectively effect either of the opposite directions of "line" movements. Reverser 41 may be manually controlled by a hand lever 41d fixed on a shaft 41e which also carries a shifter arm 41f engaging a suitable annular slot in the clutch spool 41c but with lost motion therein for purposes of automatic reversal later mentioned. The reverser may also be automatically controlled by dogs such as 43 adjustably fixed on the "line" support 23 to engage a shifter arm 41g fixed on the shaft 41e, there being spring operated detent means 44 of suitable well-known form associated with the shaft 41e for the dogs to effect automatic reversal from either direction of "line" movement, at points determined by the position of dog adjustment.

The "cross" support 24 has a step-by-step movement controlled by the movement of the "line" support 23. The mechanism for such "cross" movement is similar to that used for similar purposes in the Patent 2,234,775, issued March 11, 1941, and therefore will here be only briefly described. A ratchet mechanism generally denoted by the numeral 45 is, in this instance, bodily movable with the support 23, which also carries the "cross" slide 24 and its adjusting screw 24b as shown in Fig. 1. Meshed gears 45a, 45b are respectively fixed with the screw 24b and rotatable on a shaft 45c, each of the gears having fixed therewith one of a pair of opposite direction ratchet wheels 45d, 45e. Levers 45f, 45g are respectively pivoted on the axis of screw 24b and on shaft 45c, the levers being interconnected by a pivoted bar 45h and respectively carrying pivoted ratchet dogs 45i, 45j engageable with the different ratchet wheels. An extension rod 45k is fixed with the lever 45f for the outer end thereof to project into the path of dogs 45m adjustably spaced apart on the bed 20. The ratchet dogs are normally spring urged to engage their ratchet wheels, but either dog may be selectively retained in a disengaged position. The screw 24b and support 24 may be actuated from the dogs 45m for effecting an increment of cross movement at either or both ends of the forward and reverse movement of support 23, accordingly as one or the other, or both, of the ratchet dogs are positioned to be operative, and the value of such increments of cross movement is determined by the adjustment of dogs 45m relative to the point where the automatic reversal of the line support 23 is effected by reverser 41 and the dogs 43. The ratchet arrangement shown is for one direction of cross movement but may be modified in any suitable well-known manner to selectively effect either direction, as for example by a reverser, not shown, between the ratchet 45e and screw 24b.

It is characteristic of a differential device such as 32 that the driving train and cage 32a are indifferent to the speeds of the output gears such as 32b, 32c, except that the algebraic sum of such speeds must equal twice the speed of the cage. Thus, either branch shaft 40 or 35 may have a maximum speed equal to twice the speed of cage 32a, in which case the speed of the other shaft will be zero, or either shaft may have any speed between such maximum and zero, but the sum will be twice the cage speed. The sum of the speeds is maintained constant, in part by the use of the constant speed motor 29 for driving the cage and in part by the use of a worm 33 and worm wheel 33a of such pitch as to prevent reverse transmission of power therethrough, whereby any acceleration of output shaft 40 results in equally decelerating output shaft 35, and vice versa, the acceleration-deceleration operating to rotate the cage gears 32d, 32e about their own axes.

In the present machine the branch shafts 40, 35 of the differential are tracer controlled for acceleration of either, with accompanying deceleration of the other, as later described. During such operation the acceleration of one branch might, unless prevented, result in the other branch decelerating through zero speed into a negative or reverse speed, which is undesirable. To prevent such result and for other reasons each of the differential output shafts 35, 40 are provided with automatic one-way brake devices respectively designated by the numerals 50, 51, Fig. 3. For certain specific and optional control purposes, later explained, the structure and control of the brake 51 may be somewhat different than for brake 50, but for present description purposes they may be considered as alike, and therefore only brake 51 will here be described in detail.

Figures 4, 4A:
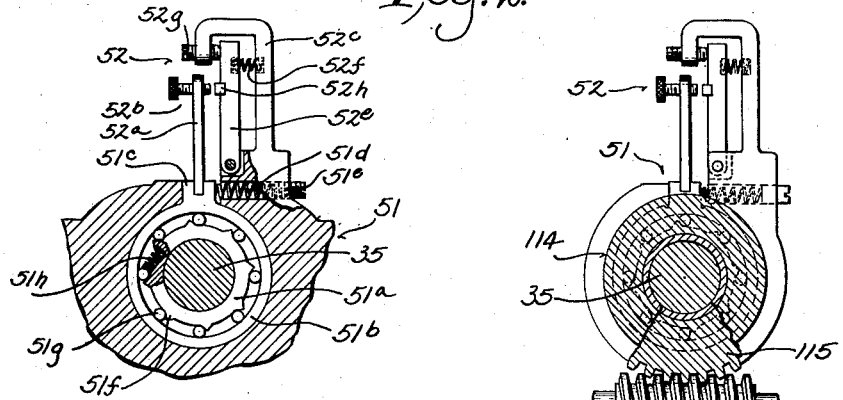
Figure 4 shows the construction of a one-way brake device and switch used in the control of the transmission of Fig. 3.
Figure 4A shows a special purpose modification contemplated for the one-way brake and switch of Fig. 4.

Referring to Fig. 4, the one-way brake 51 includes an inner member 51a fixed with shaft 35 and an outer member 51b fitting within a bore in a fixed machine housing portion to be rotatable therein but only within the limits prescribed by a slot formed in the housing bore, and an abutment portion 51c fixed on outer member 51b and having a limited movement within the slot, the member 51b being continuously yieldably urged in the normal direction of rotation of shaft 35 by the means of a spring 51d, the pressure of the spring being adjustable by a screw 51e. The outer member 51b has a cylindrical interior bore and the inner member 51a has a plurality of spaced exterior cam portions such as 51f, there being for each cam portion a roller such as 51g, each of the rollers being continuously urged by springs such as 51h in a direction to wedge the roller between the cam and the bore of the outer member. Such wedging action is prevented as long as the shaft 35 rotates in non-wedging direction faster than the outer member 51b. For present purposes the outer member is stationary, whereby the shaft is merely prevented from deceleration through zero speed into a reverse direction but for certain control purposes the outer member 51b is also rotated, as later described. Any material torque transmitted by the wedging of the rollers rotates the outer member 51b against the resistance of spring 51d until abutment 51c rests against the complementary abutment surface of the housing, and the device then acts as a substantially positive brake resisting further rotation of shaft 35 and inner member 51a relative to the housing.

For control purposes later described the one-way brake devices 50, 51, Figs. 3, 4, respectively have associated therewith switch devices 52, 53. Since the construction is alike only the switch 52 will be described in detail. Referring to Fig. 4, an arm 52a is fixed with the abutment portion 51c of the outer clutch member 51b and carries an adjustable contact screw 52b. A bracket 52c is fixed on the brake housing and carries a pivoted arm 52e which is continuously urged by a spring 52f against an adjustable positioning screw 52g. The arm carries a contact member 52h adapted to effect a closed circuit with contact 52b when the outer clutch member 51b is rotated against the resistance of spring 51d as previously described, the circuit through the contacts being open at all other times.

Figure 5:
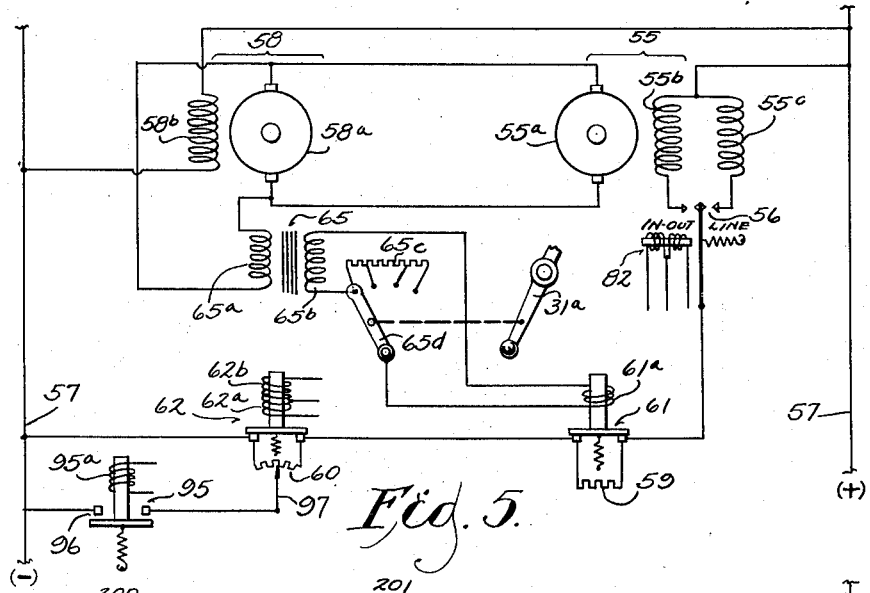
Figure 5 is a diagram of other control mechanism associated with the control mechanism of Fig. 3, more particularly for control of an acceleration-deceleration motor.

For effecting the acceleration of either differential output shaft 35, 40 with simultaneous deceleration of the other shaft, the following mechanism is provided. A generator 55, Figs. 3, 5, has an armature 55a driven at constant speed, in this instance from motor 29, and has oppositely connectible field windings 55b, 55c which may be alternatively energized through a reverser switch 56 from a suitable power source such as a rectifier 57, for example. A motor 58, Figs. 3, 5, has an armature 58a in driving relation to the output branch shaft 40 of the differential 32 and has a field winding 58b energized from the same current source as the field of the generator 55, the generator and motor armatures being connected together in a closed loop circuit as shown in Fig. 5. The generator field circuit in either direction position of reverser 56 comprises resistances 59, 60 respectively controlled by relays 61, 62. Both the relays are normally urged to a position short circuiting the corresponding resistance, but are controlled for other effects as later described. According to the position of the reverser switch 56 the current of generator 55 sets up torque in motor 58 in a direction to accelerate the "line" branch shaft 40 of the differential 32 and simultaneously correspondingly decelerate the "in-out" branch shaft 35, or vice versa.

The relay 61, Fig. 5, controls the generator field resistance 59 to establish and maintain a selected rate of acceleration-deceleration for the branch shafts. For this purpose a transformer 65, Fig. 5, has a primary winding 65a in shunt with the armature of motor 58 and a secondary winding 65b connected to energize the coil 61a of the relay. Whenever the motor 58 is either accelerating or decelerating the shaft 40 the resulting change in counter E. M. F. in the motor armature effects a current in relay coil 61a proportional to the rate of change of the motor speed, and when the change of rate reaches a value determined by the characteristics of the circuit which energizes coil 61a the relay 61 operates to make the resistance 59 effective. This reduces the field strength of the generator and correspondingly reduces the torque operating in motor 58, whereby the rate of speed change is also correspondingly reduced, but if the rate is reduced below the predetermined rate, whereby the current in coil 61a falls below a predetermined value, the relay operates to again short circuit the resistance 59. The result is that, for example, when the switch 56 is shifted whereby to reverse the torque in motor 58 the resistance 59 is shorted, whereby to provide a maximum torque which is maintained until the predetermined rate of change of speed is operating. Subsequently the relay 61 vibrates between open and closed positions to maintain the selected rate of change. Means are provided for selectively altering the circuit characteristics of relay coil 61a whereby to correspondingly change the predetermined acceleration-deceleration rate, as by a resistance 65c, there being an adjustable switch member 65d for changing the effective value of the resistance. For reasons later explained, the switch member 65d is suitably connected with the speed selector mechanism of rate changer 31, Figs. 3, 5, as to the lever 31a for instance, in a manner to change the effective resistance in the circuit of relay coil 61 in accordance with the selected rate changer speed adjustment.

By reason of the one-way brakes 50, 51 previously described, the motor 28 cannot accelerate either output branch shaft 35, 40 of the differential past the point where the other is decelerated to the minimum speed determined by the brakes. As soon as the brakes prevent a further change of rate the relay 61 will operate to short circuit the resistance 59 and the full torque of motor 58 would then operate against one of the brakes, except that such result is prevented by an automatic control effected through the resistance 60. For this purpose the relay operating coils 62a, 62b are respectively in series circuit arrangement with the switches 52, 53, Fig. 3, associated with the automatic brakes 51, 50. One or the other of the switches will close, as previously described, whenever the one-way brakes operate to prevent further change of rate of the branches. The closed switch then operates relay 62 to make the resistance 60 effective in the field circuit of generator 55, thereby reducing the torque of motor 58 to a value merely sufficient to maintain the closed position of the switch 52 or 53. But if any operating condition arises requiring increased motor torque, such, for example, as the reversal of torque in the motor or an increase of torque resistance sufficient to overcome the motor torque in the branch shaft associated with the closed switch 52 or 53, the accompanying release of pressure on the one-way brake associated with the closed switch opens the switch, and the relay 62 again operates to short circuit the resistance 60.

The described mechanism may be tracer controlled for copying on the work piece any pattern surface contour such, for example, as the one shown in Fig. 2. The tracer mechanism and control is as follows:

The tracer unit 27, Figs. 1, 3, includes a hollow frame or housing 70 in predetermined adjustment relation fixed by the means of the T bolts 27a, as has been stated, and the spindle 26 and tool or cutter 71 are adjustable inwardly or outwardly by the means of a gear 72 engaging suitable rack teeth on a spindle sleeve 73, the gear shaft having a squared end, as shown, exposed for a crank or wrench. Means, not shown, are provided for clamping the spindle sleeve 73 in adjusted position.

The tracer includes a pattern feeler or stylus portion 75, Figs. 1, 3, removably fixed at the outer end of a rod or shank 75a, the rod being mounted on the housing 70 for movement of stylus 75 either outwardly, that is to say upwardly, Fig. 3, or laterally in any direction, as for example, by a ball pivot portion 75b. Either the outward or lateral stylus movement shifts a contact arm 76, which is pivoted on the housing 70, through a slidable connector rod member 77 aligned with rod 75a and with its lower end, Fig. 3, engaging a conical seat in a member 75c removably fixed with the upper end of the rod.

Various removable and interchangeable stylus members 75 are used having different length according to the maximum depth of pattern contour to be traced, and having end forms corresponding to different cutters. Nevertheless, it is preferable, for reasons later explained, that for any length of the stylus member, equal movement either outwardly or laterally of the stylus shall result in substantially the same pivotal movement of contact bar 76. Such result is obtained by interchangeably substituting different members 75c having different angles for the cone socket engaging the end of rod 77, the angles being in accordance with the extension of the stylus member then in use. It will be noted that, as later explained, since the stylus members are interchangeable the variable control of relay 61, Fig. 5, could be avoided by use of stylus members of a size determined by the lag distance difference at different settings of the rate changer 31, the tracer contacts being adjusted accordingly.

The pivoted contact bar 76 is continuously yieldably urged inwardly, that is to say downwardly in Fig. 3, as by suitable spring means, to a position effecting a closed circuit through an adjustable "in" contact screw 80, which is in the normal position when the stylus is free of the pattern, the stylus then being also in furtherest down and laterally centered position, Fig. 3.

Sufficient displacement of the stylus 75 either laterally or outwardly from the "in" position shown in Fig. 3 will move the contact bar 76 to open the "in" contact 80 and close a circuit through an adjustable "out" contact screw 81 carried on a contact bar 81a, pivoted on the frame, which is continuously urged, as by suitable spring means, against an adjustable positioning screw 81b.

The pattern and stylus controlled movements of the tracer contact bar 76 control the operation of both of the reverser switches 38 and 56. Switch 56, Figs. 3, 5, is controlled through a relay 82. This relay is continuously urged, as by the spring means shown, in a direction closing the switch contact to energize field coil 55c of generator 55 and the arrangement is such that the torque of motor 58 is then in a direction to accelerate the "line" support 23 and simultaneously decelerate the "in-out" support 25. But when either of the contacts 80, 81 is closed one or the other of the relay coils 82a, 82b is energized to shift reverser switch 56 from a suitable source of current, as, for example, from a relatively low voltage tap on a high resistance 83 associated with the current source 57, the switch operates to energize the other generator field coil 55b and reverse the torque of motor 58, whereby to decelerate the "line" support 23 and simultaneously accelerate the "in-out" support 25.

The "in" or "out" direction of movement of the support 25 depends upon whether the tracer contact 80 or 81 is closed. The reverser 36, Fig. 3, is controlled by the reverser switch 38, as stated, which is operated by a relay 86. The "in" contact 80 is in circuit with a relay coil 86a for engaging the "in" clutch members 36a, 36c when the contact is closed, while the "out" contact 81 is in circuit with a relay coil 86b for engaging the "out" clutch members 36b, 36d. However, since the present control requires relatively infrequent change from "in" to "out" direction, or vice versa, the relay 86 is controlled to maintain switch 56 in a previous position until the tracer control demands the other position. This is effected by a spring 86c which is either closed contact position of the reverser switch 38 provides sufficient bias to maintain the position until the opposite direction coil of the relay is energized. Moreover, as later appears, it is not necessary for the control of the present machine to change the clutch engagement of reverser 36 except when the clutch members and support 25 are stationary or substantially so, which is of material benefit to the operation and life of the clutching surfaces.

Figure 6A:
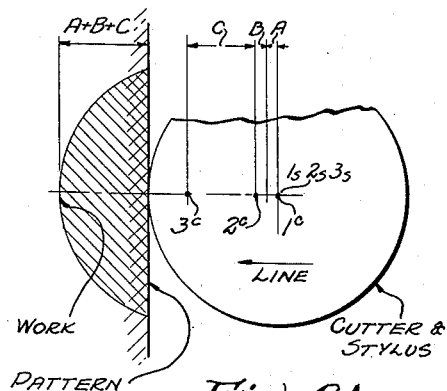
Figures 6A, 6B and 7A, 7B are diagrams for the explanation of time lag in control operations in copying machines and the like, as relates to the method and machine of the invention.

Automatic copying machines must operate by changing the relative speed of two movable supports at the points where a change of pattern contour requires a change in the path of cutter movement, and such changes of relative speed will always involve a delay or time lag between initiating and completing the correction operation. Fig. 6A diagrammatically shows the effect of time lag when the operation requires the "line" movement to be brought to a stop as, for example, when the tracer stylus is moving to the left in Fig. 2 and contacts the straight-out surface at the left of the pattern.

The cutter and stylus of Fig. 6A are assumed to be of the same size and with their radius centers correspondingly positioned relative, respectively, to the pattern surface and to the intended work surface when the "line" movement causes the stylus to contact the surface of the pattern but, for convenience of indicating relative positions at different points of the control cycle, they are shown superimposed at the instant of contact. After the initial contact the cutter travels a lag distance indicated as A before the stylus is displaced sufficiently, relative to its support, to initiate a control impulse. If the tracer control operates through a relay the cutter travels a further distance B while the relay operates to release a power impulse therethrough. Finally, the cutter travels a farther distance C before the power impulse can operate to bring the cutter to a stop against the inertia resistance, etc., of the transmission and support.

At the completion of the operation the cutter of Fig. 6A has overrun or moved past the intended work surface a distance corresponding to the combined tracer, relay and machine lag distances A+B+C. It will be noted that during the correction operation the stylus is stationary relative to the pattern surface, but it is displaced relative to its support, which moves with the cutter, by the same lag distance A+B+C. The several instant positions of the radius centers are indicated as $1_s$, $2_s$, $3_s$ for the stylus, and $1_c$, $2_c$, $3_c$ for the cutter. It will be understood that the lag distances involved are determined in part by the initial speed and are exaggerated in the diagram as compared to actual lag distances involved in copying.

Figure 6B:
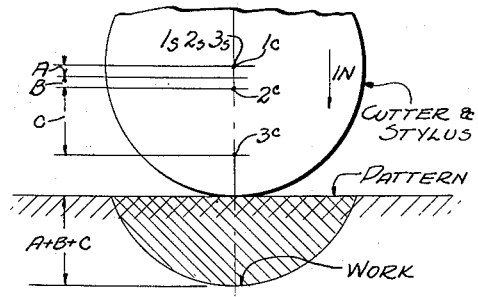

Similarly, Fig. 6B diagrammatically shows the effect of the lags, also where the cutter and stylus are of the same size, when the correction operation requires bringing the "in" movement to a stop, as when moving straight down against one of the horizontal pattern surfaces, Fig. 2. The lag distances A+B+C of Figs. 6A, 6B will be the same provided the initial speed, resistance to change of support velocity, and power used, are the same for both operations.

As stated, lag and overrun such as referred to in the diagrams Figs. 6A, 6B are inherent in all speed corrective operations and therefore in all automatic copying machines. It appears that in previous machines the effect of such lag and the attendant overrun has been objectionable, especially for finishing operations, in that traversing speeds, and consequently the machine production, must be reduced according to the accuracy of duplication required on the work piece. Thus each of the tracer, relay and machine lags represents an elapsed time interval, and for each of the lags the overrun will be reduced as the initial speed of travel of the support is reduced. But in the present machine accuracy is obtained by compensating for the lag, as will be explained, whereby accurate copying can be effected at any speed which the machine, cutter and required work surface finish will stand.

A requirement for compensating for lag is to provide a machine in which the lag is predictable. By reason of the control characteristics and simultaneous acceleration-deceleration control of the present machine the total machine lag distance C for the operations of the diagrams Figs. 6A, 6B, for example, will be predetermined for any particular machine of the mechanism described. Thus, in the present machine the inertia resistance for any acceleration-deceleration operation is the sum of inertia resisting rate change of the supports 23, 25 combined with the sum of the individual inertia of the interconnecting transmission parts, irrespective of whether the individual components are being accelerated or decelerated. It results that inertial resistance for both of the two rate change operations of Figs. 6A, 6B is the same, which has various advantages, but in any event the time required for the machine lag C will be the same for both the operations by reason of the described control of the motor 58 for constant acceleration-deceleration rate. The lag distance C would, unless prevented, vary according to variations in the average speed of the support during the change from maximum to zero speed, the average speed being half the maximum speed where the rate of change is constant as is here the case, but such variation is here prevented by the described adjustment of the resistance 65c, Fig. 5, which effects the result by varying the time of the operations mentioned as the maximum support rate is increased or decreased, as determined by the position of rate change lever 31a. Therefore, the machine operates to maintain a predetermined lag C, Figs. 6A, 6B, at any setting of the rate changer 31. It will be noted that for the machine of Fig. 1 variations in the weight of the pattern 22 and work piece 21 do not affect lag C, since those parts are not involved in the inertia resisting corrective operations, but in any case the described control, Fig. 5, of the acceleration and deceleration rate of motor 58 through resistance 59 would effect a substantially constant lag C in spite of variations in inertia.

Having effected a predetermined lag distance C as described, there is no difficulty in effecting a predetermined value of the total lag distance $A+B+C$ for such operations as those of Figs. 6A, 6B. The relays involved in lag B may have constant lag characteristics with substantially any suitable type of relay, and similarly for the tracer lag A, particularly if the interchangeable members 75c, respectively for use with different length of the stylus members 75, are constructed as described for equal increments of lateral and vertical stylus movement to effect equal relative movement of the tracer contacts.

It will be noted that, in any event, if the tracer and relays are sufficiently sensitive, the lag distances A and B become relatively small. It is contemplated that either for the tracer means, or for the relay means, or for both, devices may be used having a very small time lag, as, for example, bridge type electric tracers controlling relay tubes of the electronic type, or the like, whereby to reduce lags A and B to small value, but since various types of such modified devices are well-known in the art they are not here shown, particularly since such modifications are not relied upon for effecting accuracy or speed of copying in the present machine. The lag distances A and B, similarly to lag C, may vary with the speed of the support, but it is contemplated that such variations will be negligible by reason of the small total value of $A+B$, particularly if electronic controls are used as just mentioned.

Figure 7A:
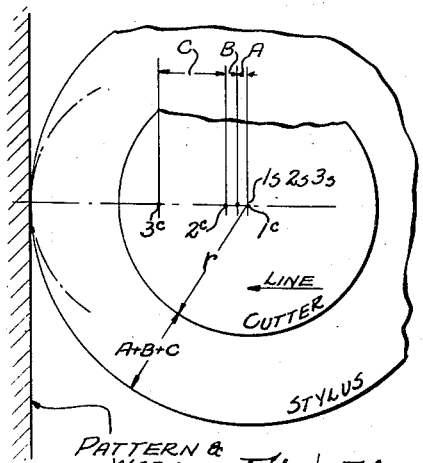
Figure 7B:
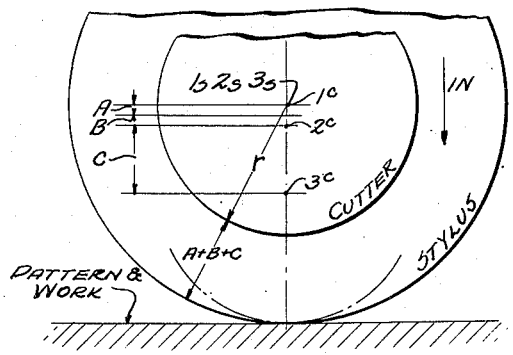

Having a predetermined lag distance $A+B+C$ the lag may be compensated for the operations of Figs. 6A, 6B. Thus, the diagrams Figs. 7A, 7B, refer to the same correction operations as Figs. 6A, 6B, that is to say Fig. 7A shows a correction operation where "line" movement at maximum rate is brought to a stop against a straight out surface, and Fig. 7B shows a correction operation where the "in" movement at maximum rate is brought to a stop against a straight "line" surface. To eliminate the lag error the radious centers of the cutter and stylus are initially correspondingly spaced, relative to the work and pattern respectively, the same as for Figs. 6A, 6B, but the radius of the end of the cutter, or of the lateral forward corner where the cutter is generally cylindrical, is smaller than the corresponding stylus radius by an amount equal to the predetermined lag distances $A+B+C$, with the result that in each instance the correction operation terminates as shown in the diagrams with the cutter in accurate position relative to the intended work surface. The lag and overrun are present, as for Figs. 6A, 6B, but do not cause inaccuracy of the work surface.

It will now be shown that, where the lag $A+B+C$ is compensated, as described, for the two maximum-to-zero speed operations of Figs. 7A, 7B, the control mechanism of the machine will operate to correspondingly compensate for the lag for all other copying, whereby the copying performed in the machine is inherently accurate in spite of the lag.

Referring to Fig. 3, the cutter 11 has a radius $r$ and the stylus 75 has a radius $r+A+B+C$ the same as in Figs. 7A, 7B. The corresponding radius centers are adjusted to normally stand in corresponding positions relative to the intended work surface and the pattern surface, respectively, when the stylus is free of the pattern. By reason of the described interconnection of control of supports 23, 25, a correction operation which decelerates the speed of the one support to zero, as in the operations of Figs. 6A, 6B, 7A, 7B also simultaneously accelerates the speed of the other support to a maximum speed determined by the adjustment position of rate changer 31. It results that the cutter 11 effects correction movements by travel in substantially arcuate paths such as in the curves shown in the diagrams Figs. 8 to 12 etc. The curved path portions are actually parabolas, but correspond so nearly to circular arcs having a radius equal to the lag distance C that they may be so considered for any copying operations at any speed.

It will be understood that all the operation diagrams later discussed are greatly magnified and necessarily very greatly exaggerate the lag distances and scale of the cutter path, as comparted to the radius of the cutter and stylus, in order to clearly show the path form.

Figure 8:
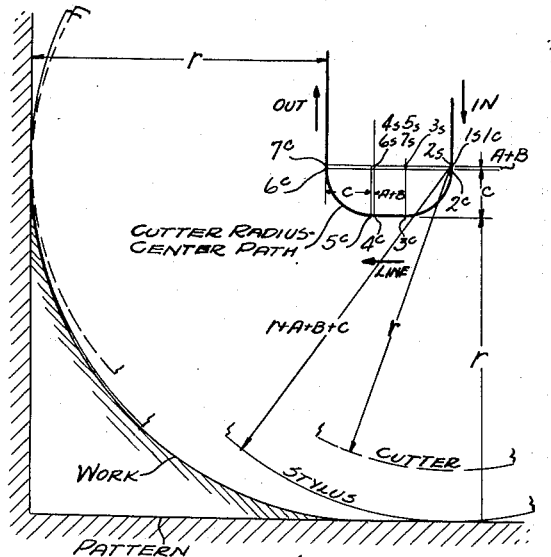
Figures 8, 9, 10, 11, 12, 13, 14 are diagrams for the explanation of certain control operations and effects in this machine when the machine is operating on pattern contours characteristic of copying operations generally, the lag values and therefore the cutter path curves of Fig. 12 being of reduced scale.

The right-hand portion of the diagram Fig. 8 shows the cutter path for the machine of Fig. 1 for the same operation as for Figs. 6B, 7B, that is to say for a change from maximum to zero "in" speed, but here accompanied by a simultaneous change from zero to maximum "line" speed by reason of the described interconnection of controls of the present machine. Similarly, the left-hand portion Fig. 8 shows a change from maximum to zero "line" speed, as in Figs. 6A, 7A, but with accompanying change from zero to maximum "out" speed, since the operation results from the closing of the "out" contact 81, as will be explained.

In explanation of the diagram Fig. 8: It will be understood that the cutter and stylus radius center paths are superimposed for purposes of comparison but, in this and the other diagrams, are really spaced apart in accordance with the spacing of the tracer and cutter, Fig. 1. When the tracer stylus 75 is free of the pattern the "in" contact 80, Fig. 3, is closed, whereby the controls operate to effect straight "in" movement at maximum rate. The tracer stylus contacts the pattern during the "in" movement when its radius center arrives at the point $1_s$ of the diagram, at the right in Fig. 8, the cutter radius center then being correspondingly positioned relative to the intended work surface, as indicated at $1_c$ of the diagram.

The continued "in" movement from point $1_s$ $1_c$, Fig. 8, opens the tracer contact 80, whereby the reverser relay coil 82b is deenergized and reverser switch 56 is shifted from the "in-out" to the "line" position, reversing the torque of motor 58 to effect acceleration of "line" movement, to the left in Fig. 8 as determined by the selected initial position of the reverser 41, Fig. 3, with simultaneous deceleration of the "in" movement. At the time such acceleration-deceleration starts the cutter radius center has travelled inwardly through the lag distance $A+B$ and stands at the diagram point $2_c$, the stylus having thereby been correspondingly displaced outwardly, that is to say upwardly in Figs. 3, 8, relative to its support.

The acceleration of "line" movement, points $2_c$ to $3_c$, Fig. 8, and simultaneous deceleration of "in" movement continues at a predetermined rate, as has been described, until the "line" branch transmission is running at maximum speed and the "in-out" branch is at zero speed at the point $3_c$. The "line" branch cannot be further accelerated since it is prevented by the one-way brake device 51 of the "in-out" branch, and when the "in-out" branch speed becomes zero the switch 52, Figs. 3, 4, of the one-way brake 51, energizes the relay 62, Fig. 5, to insert the resistance 60 into the field circuit of generator 55, as described, whereby to reduce the torque of motor 58 to a predetermined minimum.

At the completion of "line" acceleration, just described, the cutter periphery is contacting the work at the level of the intended work surface. Since the tracer support moves with the cutter the stylus has been displaced outwardly relative to its support and to the cutter, that is to say upwardly in Figs. 3, 8, by the amount of the total lag distance $A+B+C$. However, the spacing of the tracer "in" contact 80 and "out" contact 81, Fig. 3, is such that the upward displacement of the stylus as described still leaves the "out" contact open by an amount equivalent to a possible further movement of the stylus equal to at least the tracer lag distance A.

If, during the straight "line" movement starting at points $3_c$ $3_s$, Fig. 8, as described, the tracer stylus contacts a straight "out" pattern surface such as is there shown, a straight "out" movement results from a "line" deceleration control cycle as follows:

Assuming that the stylus Fig. 8 laterally contacts the straight "out" portion of the pattern Fig. 8 when the stylus radius center is at the diagram point $4_s$ and with the cutter radius center at the point $4_c$, then the further movement to the left through a distance equal to tracer lag distance A displaces the stylus laterally a corresponding distance. Since the tracer contact bar was already displaced a distance equivalent to lags $A+B+C$ by the described vertical displacement of the stylus the added lateral displacement closes the "out" contact 81 and the relay coils 86b and 82a are simultaneously energized, the reverser clutches 36a, 36b being thereby shifted from an "in" driving connection, held over during the "line" movement from the previous "in" movement, to an "out" driving connection, and the field of generator 55 being reversed whereby to reverse the torque direction of motor 58. Such torque reversal opens the previously closed switch 52, Figs. 3, 4, associated with one-way brake 51 thereby to short circuit the resistance 60, Fig. 5, of the generator field, and since the field resistance 59 is also shorted as a holdover from termination of the last previous acceleration operation, the motor 58 starts the "line" deceleration and "out" acceleration cycle, at the left Fig. 8, with maximum motor torque, although the described vibratory operation of the relay 61 immediately assumes control of the motor torque for effecting a constant acceleration rate.

In the operations described, and for various other operations, it is desirable that the tracer stylus 75 shall be biased to prefer vertical movement, rather than lateral movement, Fig. 3, especially when a part of the pressure on the stylus is in the one or the other direction of "line" movement. For this purpose suitable springs such as 75f, Fig. 3, may be used, with suitable pressure adjusting means, such as abutment screws 75g.

The "out" accelerating cycle starts after the cutter has moved from point $4_c$, Fig. 8, a distance equal to the combined tracer and relay lags $A+B$, when the cutter and stylus radius centers are, respectively, at the points $5_c$, $5_s$, and proceeds until the "out" movement is at maximum rate and the "line" movement is at zero rate. At this time the cutter radius center has reached the point $6_c$ of the diagram. It will be noted that at the start of the "line" deceleration, at the point $5_c$ of the diagram Fig. 8, the stylus was displaced outwardly, that is to say upwardly in Fig. 8, relative to its support and to the cutter, by an amount equal to the lag distance $A+B+C$. During the "line" deceleration operation, between points $5_c$, $6_c$ of the diagram, the outward movement of its support has permitted the tracer stylus to return toward the normal position of Fig. 3 through a distance equal to the lag distance C. However, such stylus return movement does not open the "out" contact 81, because the stylus has meanwhile been displaced laterally an amount equal to the lag distance $A+B+C$, which together with the remaining portion $A+B$ of previous vertical displacement, retains the out contact closed at the diagram point $6_c$. The "out" acceleration, but not the "out" movement, is halted at this point by the one-way brake 50, Fig. 3, which prevents further "line" deceleration and simultaneously closes the switch 53 as soon as the "line" speed becomes zero whereby to operate relay 62 to reduce the torque of motor 58 in the manner previously described.

Thus, the straight "out" movement starts with the cutter radius center at point $6_c$ of the diagram Fig. 8, and with the tracer "out" contact 81 still closed. Further "out" movement to the points $7_s$, $7_c$ of the diagram permits a return of the stylus to a position of zero vertical displacement to complete the cycle with the cutter traveling straight out. However, assuming that the "out" contact should be open at this point, the relay 82 will operate to close the "line" accelerating contact of reverser switch 56 for an interval sufficient to further laterally displace the stylus, whereby to close the "out" contact for the straight outward movement. Thus straight "out" movement will result from the stylus contacting the straight outward pattern surface, Fig. 8, irrespective of whether the tracer "out" contact is closed or open at point 7c of the diagram. If it is closed at that point it will remain closed, and if it is open an increment of "line" movement will operate to effect its closing. Moreover, if desired, the cone sockets of the members 75c, Fig. 3, may be made of such angle as to insure that the lateral displacement at diagram point 7c effects a closed "out" contact.

Figure 9:
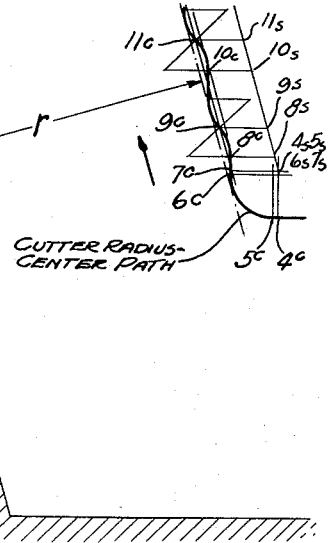
Figure 10:
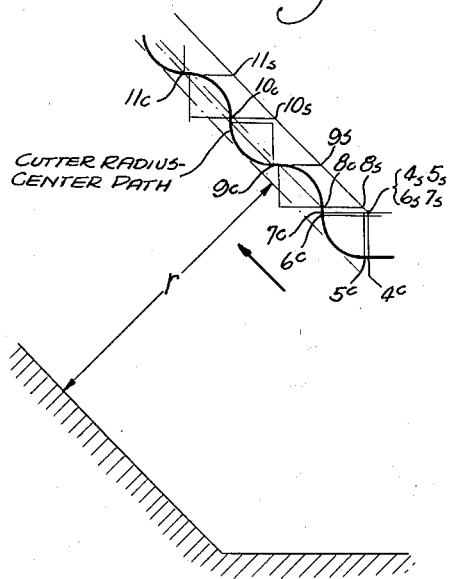
Figure 11:
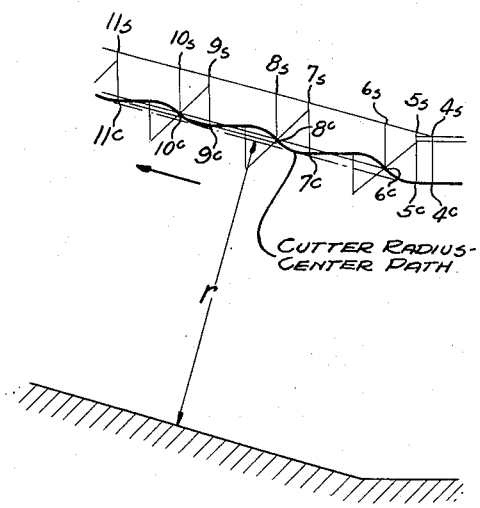

But, referring to Figs. 9, 10, 11, if the pattern angle is not straight "out" when the cutter radius center reaches the point 7c of the diagram Fig. 8, or if the pattern angle changes during subsequent straight "out" movement, the tracer operates to suitably proportion the relative "line" and "out" movements whereby to force the cutter to follow the angle of the pattern.

Thus the diagram, Fig. 9, shows a characteristic cutter radius-center path when tracing a steep outward angle, in this instance about 75 degrees. For convenience it is assumed that during a "line" movement to the left, Fig. 9, similar to the described operation of Fig. 8, the tracer stylus laterally contacts the angular pattern surface when the stylus and cutter radius centers are respectively at points 4s, 4c of Fig. 9, thereby initiating a cycle of "line" deceleration and "out" acceleration, as described for Fig. 8, such cycle being completed with the cutter traveling straight "out" at the point 7c and with the tracer stylus at point 7s displaced laterally relative to its support a distance sufficient to just close the "out" contact 81, Fig. 3. Owing to the angle of the pattern, the tracer stylus at points 8s, 8c of the diagram has returned laterally toward the normal central position, shown in Fig. 3, a distance sufficient to open the out contact and start a "line" accelerating, "out" decelerating, control operation which continues until, at the diagram point 9s, 9c, the resulting "line" movement has again effected lateral stylus displacement sufficient to close the "out" contact and started a control operation decelerating the "line" and accelerating the "out" movement. Similar cycles of alternate "line" acceleration and "out" acceleration continue by reason of alternate closing and opening of the "out" contact as long as the pattern angle remains unchanged, each cycle effecting the accurate positioning of the cutter radius center at the distance r for the intended work surface.

The diagram of Fig. 10 shows the cutter path for an outward angle of about 45°. The control operation is by alternate "line" and "out" acceleration cycles similar to the diagram of Fig. 9 except that in this instance the curve representing the cutter radius-center path is different, being characteristic of angles where the pattern angle requires about equal "line" and "out" movement but, similarly to Fig. 9, each cycle brings the cutter radius center to the exact distance r required for the intended work surface.

For the diagram of Fig. 11 the control cycle is similar, and results in similar accuracy of work surface, but is characteristic of the copying of relatively small outward angles, in this instance about 15 degrees. For such angles the initial displacement of the stylus is outward, instead of lateral, but the angle is similarly traced by alternate closing and opening of the "out" contact.

The diagrams Figs. 9, 10, 11 are characteristic of the primary method here used for the copying of pattern surfaces which are at an angle with the "line" and "in-out" paths of movement. For such angular surfaces the cutter path includes alternately opposite curves respectively representing simultaneous "line" deceleration, "out" acceleration, and simultaneous "out" deceleration, "line" acceleration, such curves each being in the form of a circular arc having a radius equal to the machine lag distance C, as previously noted. By reason of the arrangement of transmission and control mechanism described each characteristic cycle of cutter-path movement, at one point of the simultaneous "line" deceleration, "out" acceleration, curve positions the cutter for correctly copying the pattern surface, such point being located on the arcuate cutter path curve at the point where it crosses a line vertical to the angular work surface and passing through the radius-center of the curve. Furthermore, the cutter path, in addition to the curved path portions mentioned, includes straight path portions, either in straight "out" direction (Fig. 9), or in straight "line" direction (Fig. 11), or both (Fig. 10), the result being average "out" and "line" speeds in each cycle such that each cycle effects the required relative "out" and "line" movement for the particular angle being copied. The alternately opposite curves operate to move the cutter toward and from the work surface, but it will be understood that such movements are very greatly exaggerated in the diagrams, and that in practice such movements are so small and so closely spaced that the relatively very large radius of the cutter operates to effect a substantially flat surface on the work.

Moreover, the accuracy of the copying is not altered by any change of copying speed provided the stylus and cutter relative size and positioning are maintained as described, either by interchanging the stylus members 75, Fig. 3, to suit different values of lag distance C, as previously mentioned, or by maintaining lag distance C constant for various copying speeds as by the adjustment of the resistance 65c, Fig. 5, previously described; it being understood that the lag distance C just referred to is the machine lag for the two primary operations of change from maximum to zero "line" speed, Fig. 7A, and of change from maximum to zero "in" (or "out") speed, Fig. 7B. While the machine lag C obviously varies for other operations, being different for the copying of different angles, nevertheless, with the arrangement described the lags are correctly automatically compensated for all angles and at any copying speed.

It is desirable, as later appears, to provide supplemental control means operable under certain conditions to effect outward displacement of the stylus relative to the cutter substantially as at the points 4s, 4c of the operation diagrams Figs. 8, 9, 10, 11. Supplemental control means are provided for this purpose including the tracer contact bars 90, 91, Fig. 3, each pivoted to the tracer frame or housing and continuously urged, as by spring means 90a, in a direction to effect a closed contact 90b. The arrangement is such that contact 90b remains closed at all times except that it is opened when the stylus is displaced outwardly, that is to say upwardly in Fig. 3, substantially the total lag distance $A+B+C$, as occurs at the diagram points just mentioned. Thus, during outward stylus displacement an abutment 90c fixed with tracer rod 75a pivots both of the supplemental contact bars while maintaining a closed contact 90b, but at the desired value of outward displacement the contact is opened by an adjustable abutment screw 91a preventing further outward movement of the bar 91.

The circuit of supplemental contact 90b, Fig. 3, is connected to operate the reversers 56 and 38 in the same manner as does the circuit of the "in" contact 80, but is limited by series arrangement with a switch 93 to operate only when the "out" contact 81 is open, and further limited by series arrangement with a switch 94 to operate only when the "line" movement is at maximum rate whereby switch 52 is closed as has been described. The switch 93 is normally closed, but when the contact 81 is closed switch 93 is opened by operation of a relay coil 93a. The switch 94 is normally open, but if the switch 52 is closed, the switch 94 is closed by a coil 94a in parallel with the circuit of the coil 62b to receive current only through switch 52. Assuming that the contact 81 is open, then at any time when the "line" speed is maximum, as occurs at the points 4s, 4c in each of the operation diagrams mentioned, the supplemental contact 90a will operate to effect an increment of "in" movement of the cutter, with corresponding outward displacement of the stylus unless the stylus is already outwardly displaced by an amount sufficient to open contact 90b, as determined by the adjustment of abutment 91a. The initial inward movement will be almost immediately interrupted, since it is accompanied by a reversal of torque of motor 58 which opens the switch 52, but such interruption again reverses the motor torque to provide another increment of inward movement and such increments will be repeated until the determined tracer outward displacement is obtained, whereby to open the supplemental contact 90b.

It will be noted that during any operation of the supplemental control from tracer contact 90b, as described, the speed of the clutch members of reverser 36 is substantially zero, as is also the case for any other operation of this reverser. The supplemental control, instead of effecting reversal of movement merely effects repeated small increments of inward adjustment.

The rate at which such successive increments effect the desired stylus outward displacement would be relatively slow, unless prevented, since at maximum "line" speed only a relatively small torque is available from motor 58; the resistance 60, Figs. 3, 5, then being in series with the field coil of generator 55, as has been explained. The circuit of the supplemental contact 90b therefore may include a coil 95a of a relay 95, Figs. 3, 5, which operates during each increment of supplemental inward movement to short circuit through a switch 96 any desired portion of the resistance 60, as determined by the adjustment of a controller 97. The value of adjustment increments resulting from operation of supplemental "in" contact 90b may be determined according to the adjustment of the resistance controller 97, at least up to a point where the combined effect is sufficient for the cutter to follow a fairly steep inward pattern angle, while maintaining the stylus outward displacement as determined by the adjustment of the abutment 91a.

The supplemental "in" control effected by contact 90b has various uses, as will appear, but it may be here noted, as will be apparent, that during straight "line" movement it maintains the "out" contact 81 open by only the amount of the tracer lag distance A, whereby it provides for straight "line" surfaces to be copied with a very small limit of inaccuracy as determined by the adjustment of abutment 91a, and provides for the starting of all outward angles, such as are shown in Figs. 8, 9, 10, 11 with a similarly small limit of inaccuracy.

Figures 12, 13:
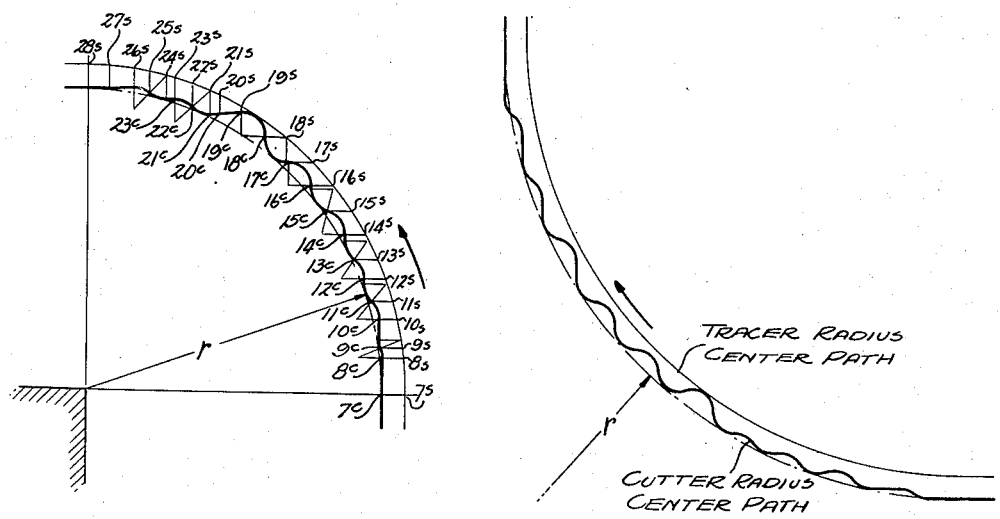

The diagram Fig. 12 shows the cutter path cyclic curves in reduced scale relative to the other diagrams, although still greatly enlarged over the actual size. This diagram is characteristic of the control operation when the pattern surface changes from an outward angle, in this instance a straight out angle, to a straight line surface, as might occur, for example, when the stylus moves outward on the vertical surface at the left in Fig. 2. As pointed out for the operation of the diagram of Fig. 8 the straight out movement is effected with the out contact 81 just closed, the stylus being displaced laterally but not vertically. This is the stylus radius center displacement position assumed at the point 7s of the diagram Fig. 12 where the stylus and cutter radius centers stand at the same level as the horizontal pattern surface. The curved line beginning at points 7s, Fig. 12, indicates the stylus radius center displacement position as the stylus moves around the corner of the pattern. The cutter radius center, starting at point 7c continues to move straight out until, at point 8s the stylus has moved sufficiently above the pattern corner for a lateral return of the stylus to open the "out" contact 81, Fig. 3, and for "line" acceleration to start. At point 9s the "out" contact has closed again and a cycle of "out" acceleration has started. Alternate cycles of such "line" and "out" acceleration continue by reason of alternate decrease and increase of stylus lateral displacement until, as at the points 19s, 19c, for example, the last previous cycle of "line" acceleration has terminated with a maximum rate of "line" speed and with the stylus having relatively small displacement both laterally and outwardly.

At the point 19s, Fig. 12, therefore, the previously described supplemental contact 90b, Fig. 3, comes into operation to start inward adjustment impulses causing the cutter to follow an inwardly angular path, as shown, until at the point 20s the stylus is sufficiently displaced outwardly for the supplemental contact 90b to remain open, when "line" movement alone continues until, at point 21s, there is sufficient further displacement for the "out" contact to close. The remainder of the pattern corner is copied by alternate "line" and "out" acceleration caused by vertical stylus displacement and, at the points such as 23s, 26s where the vertical displacement is not sufficient to maintain the supplemental contact 90b open when at the same time the "line" speed reaches maximum there is an intervening portion of inward angular movement, as described. The corner copying cycle terminates, as at point 28s, with the stylus and cutter properly positioned similarly to point 3s, Fig. 8, for subsequent straight "line" movement. It will be noted that for the operation of Fig. 12, similarly to Figs. 8, 9, 10, 11, each cycle of alternate "line" and "out" acceleration effects accurate positioning of the cutter radius center relative to the work piece.

The control diagram, Fig. 12, is also generally characteristic of the tracing of outwardly curved surfaces which curve in the direction of the "line" movement. That is to say, steep outward curves in the direction mentioned are traced by alternate "out" and "line" acceleration cycles effected by lateral displacement of the stylus in the manner indicated between points 7s, 18s, Fig. 12, for example, while curved portions where the outward movement is relatively small are traced by vertical displacement of the stylus, with intervening operation of the supplemental contact 90b as at the points 19s, 23s, 26s, Fig. 12.

The operation diagram Fig. 13 is similar to Fig. 12 but is characteristic for the copying of outwardly curved surfaces where the curve is opposite to the direction of "line" movement. It will be seen that, as in Fig. 12, the curve of the cutter path changes during the copying operation according to the instant angle of the contact between the tracer and pattern. Thus at the start of the operation Fig. 13 the cutter path is similar to that for the small outward angle of Fig. 11, but as the angle becomes increasingly steep the path corresponds more nearly to that for the steep outward angle of Fig. 9, and finally to the straight out movement at the left in Fig. 8.

As to each of the diagrams, Figs. 9 to 13, it is to be understood, as previously mentioned, that the scale of the cutter path is very greatly exaggerated relative to the scale of cutter and stylus radius. The amplitude and spacing of the cyclic curves by which the cutter path copies the pattern contour may be of substantially any minimum size desired, depending on the power available from motor 58 for overcoming the inertia resistance to change of rate of the parts, the motor power determining the maximum available acceleration rate which can be controlled by the motor control relay 61.

But in any event, within any reasonable limits for the maximum magnitude of the lag and overrun, that is to say for the amplitude and spacing of the cyclic curves of the operations of diagrams Figs. 8 to 13, all of the line and outwardly angled or curved surfaces of the several operation diagrams will be accurately copied. In all such operations the curves of the cutter path as determined by the tracer control of the cycles insures that each individual cycle of alternate "line" and "out" acceleration accurately proportions the relative "line" and "out" speed to bring the cutter periphery to the same position relative to the work as is traced on the pattern contour by the stylus periphery, and the average speed in both paths of cutter movement is obviously proportioned for exactly copying the angle.

It will be noted that where the line and outwardly angled or curved surfaces are accurately copied, as described, the entire copying operation will be correspondingly accurate, since all angles or curves which are inward for the one direction of tool traverse are outwardly copied during the next succeeding opposite direction of traverse, as is obvious upon inspection of Fig. 2. The whole pattern contour will therefore be traversed, in one line direction or the other, with all angles and curves accurately copied in the manner of the diagrams Figs. 8 to 13, provided only that the cutter does not cut inside the intended work surface when the angles and curves are traced in their inward direction, and in the present machine the same constant lag characteristics which provide accuracy for the operations of Figs. 8 to 13 also insure that the cutter will not move inside the intended work surface when traversing inward angles and curves.

Figures 14, 15:
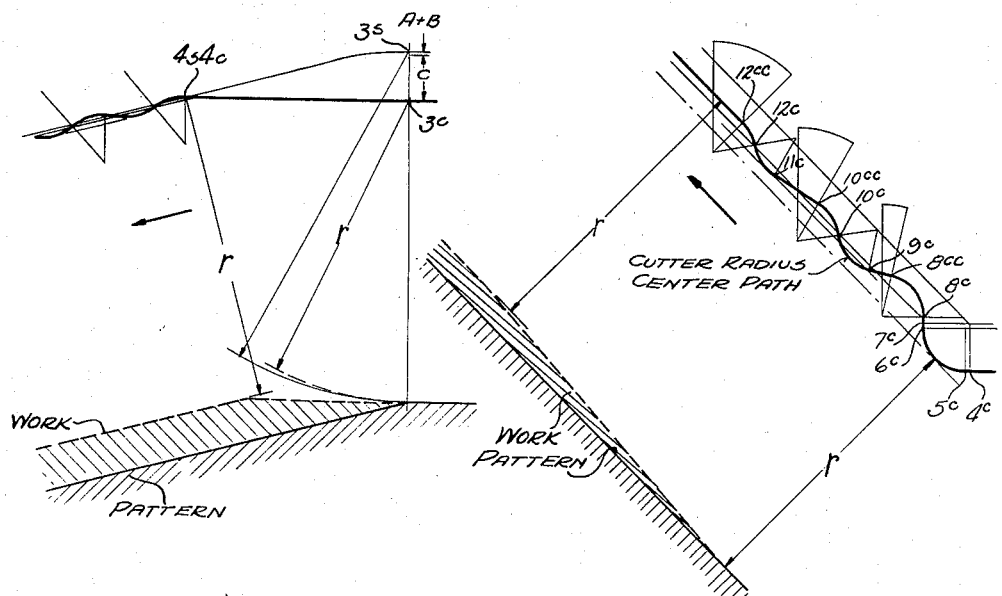
Figure 15 is a diagram for the explanation of a characteristic control result when using the special or supplemental control devices of Figs. 4A, 5B for straight path copying of angles.

Thus, referring to Fig. 14, there will be at the start of the tracing of any inwardly directed angle or curve an overrun, such as between the points 3s, 3c and 4s, 4c of the diagram, while the stylus travels sufficiently past the point of pattern contour change for the stylus to return downwardly in the diagram from a "line" to an "in" control contact position, with the result that any inward angle or curve will be copied oversize, as indicated in the diagram. The diagram is not strictly correct, because small inward angles up to a size determined by the adjustment of the resistance controller 97, Fig. 3, of the described supplemental control effected by tracer contact 90a, will be accurately copied without the return of the tracer stylus to normal "in" position, but the cutter will not move inside the intended work surface even for small inward angles copied by the supplemental control. The oversize work material, Fig. 14, is removed and the inward pattern contour accurately copied as an outward contour, as has been explained, during the reverse direction next succeeding "line" movement.

The described constant rate acceleration and deceleration control for the motor 58 operates to make the accuracy of the copying operation substantially independent of differences in the torque resistances respectively opposing rotation of the output branch shafts 35, 40 of the differential 32. However, any such difference in torque resistance, as might occur for example from difference in instant cutting pressures etc. in the respective branches, operates as a torque urging deceleration of the branch having the greater resistance, and opposes the operation of motor 58 in the one or the other torque direction thereof. Therefore the motor 58, unless such differences are prevented, must have a power capacity, additional to that otherwise required, sufficient to overcome the maximum torque which can arise from such differences of torque resistance.

It appears preferable to prevent such differences of torque resistance, thereby to permit use of a motor 58 of correspondingly less power, with a proportionate reduction in the necessary capacity of various of the described devices for control of the motor power, and other advantages. In the present machine any material difference in torque resistance of the branch shafts 40, 35 is automatically balanced out by operation of one or the other of two restraining devices 100, 101, Fig. 3, respectively operative for restraint of the different branch shafts at transmission points each outside the point of application of the acceleration-deceleration torque of motor 58, each of the restraining devices being continuously subject to the mutual control of two torque responsive devices 102, 103, Fig. 3, respectively associated with the different branch shafts and each arranged to be driven through the restraining device of its own branch transmission.

Figures 16, 16A:
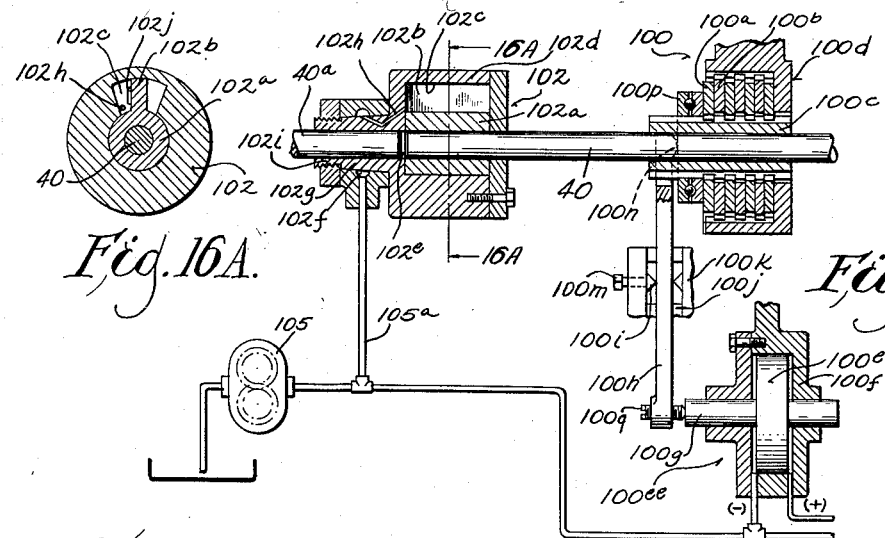
Figure 16 is a semi-diagrammatic view showing a unit of certain interconnected automatic restraining devices shown in Fig. 3 and contemplated as supplemental means for improving the operation and accuracy of the machine under certain conditions.
Figure 16A is a section taken at line 16A, 16A of Fig. 16, showing certain structural details.

Each of the restraining devices 100, 101 is of similar construction and therefore only one will be described in detail. Referring to Fig. 16, the device 100 is, in this instance, a brake device including a series of brake discs such as 100a, 100b. Every other disc of the series is slidably splined for rotation with a sleeve 100c which is fixed on shaft 40. The intervening discs are slidably splined in a suitable bore in a stationary housing portion such as 100d, the bore terminating in an end portion which acts both as a brake disc and as an abutment for axial brake pressure between the discs. Such axial pressure is effected and controlled by a piston device 100ee including a piston 100e operating within a cylinder formed by a suitable bore in a fixed housing portion 100f, there being a piston rod 100g extending to operate a lever 100h pivoted for movement against an abutment portion 100i of a block 100j which is slidable in a suitable guideway formed in a fixed housing portion 100k, there being a suitable clamp means, such as a screw 100m, for clamping the block in various positions, whereby to adjust the pressure ratio between the piston 100e and the engaged brake discs. At the one end the pivoted lever 100h has a fork portion 100n which effects axial pressure on the friction discs through an anti-friction bearing 100p, and at the other end the lever carries an adjusting screw 100q having a ball point bearing against the end of the piston rod 100g, whereby the zero pressure position of the friction discs may be adjusted to correspond with a balanced pressure position of piston 100e.

Each of the torque responsive devices 102, 103, Fig. 3, is, in this instance, similar to those shown in a copending application Serial No. 327,275, filed April 1, 1940. The devices 102, 103 are similar and therefore only one will be described in detail. Referring to Figs. 16, 16A, the device 102 includes a rotary piston member 102a fixed for rotation with the shaft 40 and comprising a piston element 102b having limited rotation in a cylinder chamber 102c formed within a cylinder member 102d, the cylinder member being fixed with a driven portion 40a of the shaft 40 which is divided, as at 102e, whereby the shaft portion 40 drives the shaft portion 40a through a coupling formed by the piston and cylinder members. The cylinder chamber 102c is arranged on the driving side of the piston element 102b and receives the pressure liquid output of a pump 105, Figs. 3, 16, through a suitable channel connection such as a pipe 105a, an annular groove 102f within the bore of a non-rotatable pressure liquid coupling member 102g, and a channel 102h within the cylinder member 102d, the cylinder member having an extension sleeve 102i forming another pressure liquid coupling member rotatably fitted in the grooved bore of the stationary coupling member 102g.

The pump 105, Figs. 3, 16, is of positive delivery type and is continuously driven at constant speed, as from the motor 29 through a suitable positive train diagrammatically indicated at 105b, Fig. 3. Suitable safety relief valve means, not shown, is contemplated for the output channel 105a of the pump but, other than such safety means, the liquid from pump 105 has no escape except through an outlet opening 102j suitably positioned in a wall of the cylinder chamber 102, the position being such that any torque resistance of shaft portion 40a tends to close off the opening, whereby the liquid can escape from pump 105 only after it has forced a relative rotation of the piston and cylinder members 102b, 102d sufficient to expose the opening against whatever instant torque resistance is operating. The arrangement is such that the pressure of the liquid in the channel 105a varies instantly with any variations in the torque resistance operating in the shaft portion 40a.

The torque responsive device 103 associated with shaft 35, Fig. 3, is of a construction similar to the described device 102, as stated, and similarly is provided with a pump 106, Fig. 3, positively driven from motor 29 at constant speed through a positive train diagrammatically indicated at 106b, the pump delivering pressure liquid to the device 103 through a pressure channel 106a, and the pressure of the liquid in the channel 106a varying instantly with any variations in the torque resistance operating in a driven shaft portion 35a, in the manner described for the torque responsive device 102.

The pressure liquid output of each of the pumps 105, 106 is connected by suitable channels to operate on each of the piston devices 100ee and 101ee, Fig. 3, for operation of the restraining devices 100 and 101. The connection is such that each piston device receives negative (—) brake releasing pressure from the torque device associated with its own transmission branch and positive (+) braking pressure from the torque device of the other transmission branch. The general arrangement is indicated by the (+) and (—) connections, Fig. 3, and the specific arrangement is shown in Fig. 16 for the piston device 100ee. If the pivot blocks, such as 100j, are properly adjusted for each of the restraining devices and the various parts properly proportioned, each restraining device 100, 101 will be of zero braking effect when the branch shaft portions 40a, 35a have equal torque resistance, since the positive and negative pressure is then equal on the opposed faces of the associated brake actuating pistons. But if either of the torque devices 102, 103 is operating against more torque resistance than the other the restraining device of the branch which has least resistance will be operated to effect a braking (+) restraint which is equal to the instant difference. The effect is to balance the driving torque of motor 29 on the branch gears 32b, 32c irrespective of differences in torque resistance operating outside the torque devices 102, 103, whereby such torque differences have no effect in accelerating or decelerating either branch of the differential, and to force the motor 29 to carry all the power load for the transmission, except the power required for acceleration-deceleration control.

On the other hand, by reason of the stated relative positioning of the motor 58 and the restraining and torque responsive devices, the restraining devices 100, 101 have no effect on the tracer controlled acceleration-deceleration torques applied by the motor 58. Thus, since the torque of motor 58 is applied between the torque devices 102, 103 its effect when decelerating the "line" branch shaft 40 and simultaneously accelerating the "in-out" branch shaft 35, for example, is to increase the torque operating in the torque device 103 by reason of the inertia of the accelerated branch parts driven through the branch shaft portion 35a, and to decrease the torque operating in the torque device 102 by reason of the inertia of the decelerated branch parts driven through the branch shaft portion 40a. It is intended that any increase in the one torque device will be made equal to the decrease in the other torque device by suitable design for equal inertia resistance of the parts driven through the different shaft portions 35a, 40a. There is, therefore, zero change in restraining effect in either of the restraining devices 100, 101 because any change in the positive or negative pressure acting on each piston is accompanied by an equal change in the opposed pressure.

It will be noted that the result just described differs from the accelerating-decelerating effect of an unbalanced force operating outside the torque devices because the outside force increases the torque in both the torque devices, thereby operating the brakes to effect a balance of torques, whereas the torque of motor 58 equally increases the torque of the one torque device and decreases the other. However, should it occur that the acceleration-deceleration effected by motor 58 operates to set up any unbalance operating outside the torque devices as, for example, might result from a change of cutting resistance opposing rotation of the shaft portions 40a, 35a, it will be automatically balanced by the operation of the restraining devices as described for forces operating outside the torque devices.

Even where the described automatic balancing means is not used the motor 29 carries all the cutting load etc. operating in the branches, except only for such differences in branch loads as might operate to accelerate one branch relative to the other. But by the use of the described automatic balancing means the motor 29 is forced to carry all the normal torque resistance of the branches and motor 58 carries only such load as is imposed by the inertia resisting a change of relative rate of the branches such as is required for the copying control.

It is sometimes desirable to control the cutter movement for angular travel in a straight path when the pattern surface is straight, that is to say except for curved surfaces or when changing direction to conform to the pattern. For such purpose the automatic brake 51 is modified as shown in Fig. 4A, to be rotatable along with its control switch 51, the speed of the brake rotation being determined by a motor 105, Fig. 3, whereby to determine a uniform simultaneous "line" and "out" or "in" speed correctly proportioned for the angular pattern surface being traced.

Figure 5A:
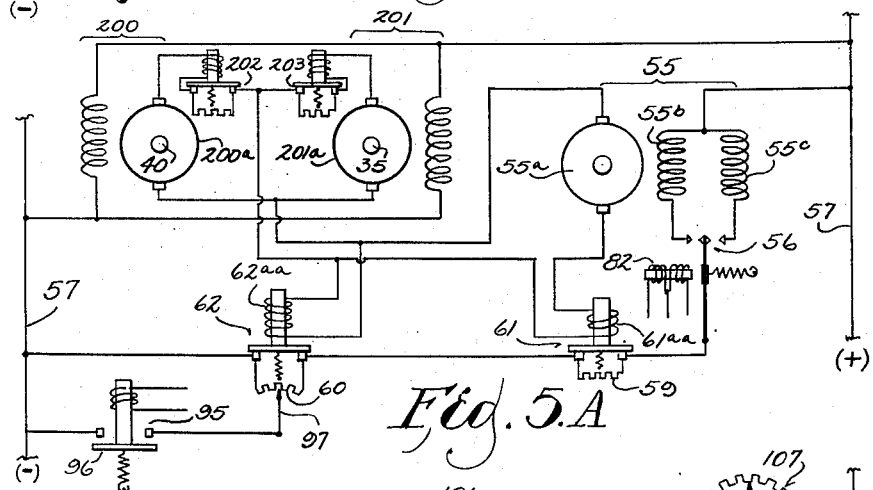
Figure 5A is a modification of the control mechanism of Fig. 5.
Figure 5B:
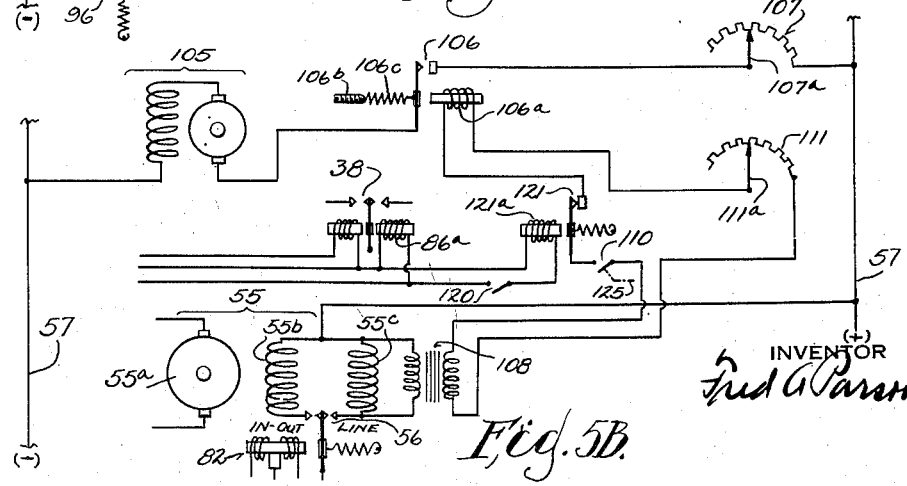
Figure 5B is a supplemental control mechanism which may be used with the control mechanism of Figs. 5, 5A for certain control purposes.

The control mechanism for such straight cutter path is as follows:

The motor 105, Figs. 3, 5B, may be of any suitable variable speed type but in this instance is a series motor supplied from the source 57 through a normally open switch 106, controlled by a relay coil 106a, and through the adjustable controller 107a of a resistor 107. The relay coil 106a receives current from the secondary coil of a transformer 108 having its primary coil in shunt with the coil 55c of the generator 55, the secondary being connectible with the relay coil 106a through a selector switch 110 and the adjustable controller 111a of a resistor 111.

Provided the switch 110 is closed, the switch 106 is then closed by relay coil 106a whenever the switch 56 is operated to either close or open the "line" contact thereof. The duration of the closed interval of switch 106 may be varied either by adjusting the resistance controller 111a, or by adjusting a screw 106b to adjust the pull of a spring 106c. These adjustments, together with the adjustment of resistance controller 107a determine the value of a current impulse transmitted to the motor 105 each time the "line" contact of switch 56 is opened or closed as stated. Referring to the diagrams Figs. 9, 10, 11, 14, and to the previous explanation thereof, it will be seen that the copying of all straight angular surfaces starts with rapidly recurrent opening and closing of the "line" contact of the switch 56, and the present control is such that the motor 105 accelerates as long as such impulses continue with the normal frequency required for the cutter path cycles of the diagrams.

The motor 105 is connected to rotate a sleeve 114 rotatably supported on the shaft 35, Figs. 3, 4A, the one end of the sleeve acting as a housing, replacing the stationary housing of Fig. 4, for the support and operation of the automatic brake 51 and switch 52 in the same manner as previously explained. The other end of the sleeve 114 has fixed therewith a worm wheel 115 driven from the motor through a worm 116 and a shaft 117, the worm and wheel being self-locking against rotation of the worm by the wheel. It will be understood that for this modified control the circuit of switch 52 operates through axially spaced collector rings and suitable contacts, not shown, associated with the rotary sleeve 114.

The arrangement is such that the motor 105 drives the sleeve 114 in the same direction as the normal rotation of shaft 35. Therefore the maximum "line" speed is determined by the adjustment of rate changer 31 only if the motor 105 is stationary, but is correspondingly reduced by any rotational speed of the sleeve. When acceleration of "line" speed from motor 58 has proceeded to a point decelerating the shaft 35 to the instant speed of sleeve 114 the brake 51 and switch 52 operate to prevent further acceleration-deceleration effect and to reduce the torque of motor 58, in the manner previously described.

The diagram, Fig. 15, shows a cutter path for about a 45° outward pattern angle similarly to Fig. 10, as results from the supplemental straight path control just described. For convenience the control operation of Fig. 15 is assumed to start, similarly to the operation of Fig. 10, with straight "out" movement at point 8c of the path. The motor 105 has previously received two acceleration impulses, respectively at the path points 4c and 6c, from the described operation of its controls of Fig. 5B, but the rotation of the sleeve 114 thereby effected to limit "line" speed does not prevent obtaining a maximum "out" speed at point 6c. At point 8c there is another acceleration impulse for motor 105 and at the point 8cc the speed of sleeve 114 driven from the motor is sufficient that the "line" speed is limited by the brake 51 for the cutter path to have an outward angle between the point 8cc, where further "line" acceleration is prevented by the brake, and the point 9c where the stylus displacement position again starts an "out" acceleration cycle. At subsequent similar points, such as 10cc, 12cc each preceding combined cycle of "out" and "line" acceleration has similarly increased the outward angle of the cutter path and after a few such cycles the limit of the relative ratio of "line" and "out" speeds, as determined by the speed of brake 51, causes the cutter path angle to be the same as the angle of the pattern, as occurs in the diagram at the point 12cc.

It will be understood that, as previously explained, the operation diagrams, including diagram Fig. 15, very greatly exaggerated the lag distances and the spacing and amplitude of the cutter curves. Similarly, the path straightening effect of each control cycle as described for the straight path control is greatly exaggerated in Fig. 15. However, in actual tracing, the cycles recur at such frequency that the straight path is quickly obtained as described for any straight angle. Once obtained there is no material force operating to change it, particularly if the machine includes the previously described supplemental control mechanism, including the restraining devices 100, 101, which automatically balance cutting load etc. in the branches. Even without such supplemental balancing control, however, the straight path control terminates with the motor 58 operating to maintain the relative "line" and "out" speeds for straight path movement. The reduced torque of the motor 58 is effected as previously described when the switch 51 closes, as at the point 12cc of the diagram, but if the "line" speed is reduced from the limit established by the rotation speed of sleeve 114, the switch 51 opens and the full torque of motor 58 operates for "line" acceleration until switch 51 is again closed. The motor 105 will, of course, start to decelerate as soon as the cycles of alternate acceleration cease, as at the point 12cc, of Fig. 15, but such deceleration merely operates to close the tracer contact 81 and start a few normal alternate acceleration cycles operating to reestablish the straight path result as at point 12cc, and for such correcting operation any curves in the cutter path have very small amplitude, merely sufficient to alternately open and close the controlling in or out contact, accordingly as the straight path control is operating for inward or outward angles.

Although the described straight cutter path control is similarly operative for outward or inward angles, as will be apparent, it is not ordinarily necesssary that it should operate for inward angles, since these are retraced as outward angles in the reverse "line" direction, as has been pointed out. Referring to Fig. 5B the straight path control for inward angles may be selectively used or eliminated accordingly as a switch 120 is open or closed. For such selective operation a normally closed, relay operated, switch 121 is added in the circuit of the relay coil 106a and when the switch 120 is closed a relay coil 121a, which is in parallel circuit arrangement with the coil 86a of reverser switch 38, operates to hold switch 121 in open position whenever reverser switch 38 is in "in" position.

The straight path control, as here shown, responds substantially normally to changes in the pattern angle. Thus, if the straight path 45° angle of Fig. 15 changes to a smaller angle, such as the 15° angle of Fig. 11, for example, there will be a few cycles of alternate "line-in" acceleration, since the limit of maximum line speed established during the preceding straight path 45° outward movement is not immediately sufficient for copying the 15° outward angle by the normal "line-out" path of Fig. 11. After a few such cycles, particularly if the straight path control is limited to operation only during "line-out" cycles as described, the path will be as in Fig. 11, and shortly thereafter it will change to straight path movement in the manner described for Fig. 15. On the other hand, if the pattern angle of Fig. 15 becomes a steeper angle, such as the 75° angle of Fig. 9 for example, there will be set up a few "line-out" acceleration cycles, further limiting the maximum line speed as described for Fig. 15, resulting in straight path movement at the new angle.

It may be desirable to disconnect the described supplemental control of tracer contact 90a when the straight path control is operative. This may be done by a suitable interconnection or interlock whereby, for example, the normally closed switch 93, Fig. 3, is opened whenever the switch 110, Fig. 5B, is closed, as by a suitable connection diagrammatically indicated at 125, Figs. 3, 5B.

The straight path control, as here shown, has the advantage that it imposes maximum speed limitations only on the "line" control. Thus the transmission and control mechanism will respond normally accurately to any pattern requirement for a sudden change of direction, as for straight "out" or straight "in" movement for example.

However, for any control system effecting straight path cutter movement for copying angular surfaces there are certain attendant disadvantages. One such is that the straight path control prevents the full degree of copying accuracy such as may be obtained by the methods previously herein described. Thus the lag involved in any change of direction, as for example for change from "line" to "out" movement between the points 4c to 7c of Figs. 10, 15, makes no difference to the accurate copying of the angle by the lag compensation method of Fig. 10, but where the cutter path is straightened out, as in Fig. 15, a choice must be made whether the tool is to cut accurately between points 5c, 6c, Fig. 15, or accurately at the points such as 12cc where the cutter path is straight, or somewhat inaccurately in both places by dividing the unavoidable inaccuracy between the two selectively inaccurate path portions, as for example by offsetting the stylus relative to the cutter, to the left in Fig. 15.

It will be noted that the straight-path inaccuracy just mentioned is, in the present control method, at maximum for the 45° angle shown in Fig. 13. Since it results from forcing the cutter to follow a path substantially central between the crests of the opposite curve portions which would occur for the same angle where the straight path control is not used, it will be apparent by inspection of Figs. 8, 9, 11 that the inaccuracy approaches zero as the pattern angle approaches either straight "out" or straight "line" movement. The inaccuracy during straight-path movement could, therefore, be avoided by use of a stylus member 75 which, at the point where it contacts the 45° angle, is of reduced size corresponding to the oversize of the finished work surface in Fig. 15, with properly decreasing stylus correction in either direction for the stylus to be of the normal size and relative positioning shown in Fig. 3 where it contacts straight "out" and straight "line" pattern surfaces. The same result could also be effected by, instead, making the cutter corner form larger than shown in Fig. 3 by corresponding amounts while maintaining the stylus of the size there shown. In either event it would then result that the preliminary or starting curves which finally effect the straight-path result, as in Fig. 15 for example, will cut the work surface too small, that is to say to the left in Fig. 15, the amount of such preliminary or starting error corresponding to the correction made at the point where the stylus contacts the pattern for the particular angle being copied.

Although all straight-path control methods are unavoidably inaccurate either in the straight path portion or in the starting portion, or both, nevertheless the present method of straight path control, if such control is desirable, has various advantages in the present machine. It does not, as stated, prevent normally rapid response to a requirement for outward or inward movement, and does not add to the unavoidable inaccuracy by increasing any lag distance involved either in the preliminary cutter curves or any subsequent cutter path curves. Furthermore, in the present machine, the control is such that any inaccuracy caused by the straight path method of copying is relatively small and of predetermined value and as pointed out can be controlled or distributed in a predetermined manner.

Suitable manual control means are contemplated for the "in-out" and "line" paths of movement, supplementing the described manual control of the "line" reverser 41 for power operated positioning of the supports, as for an initial starting position, for example. For such purposes suitable supplemental manual means, not shown, may be used for shifting the tracer elements whereby to control the power movements through the tracer contacts but under manual control.

The transmission and control of the diagram Fig. 5 serves to illustrate the desired control results as described, but various modifications are contemplated. Thus, for example, Fig. 5A shows a modification in which two motors 200, 201 are used respectively for the different differential output shafts 40, 35, both motors being powered from a generator such as 55. The armatures 200a, 201a are in parallel circuit for receiving current from the generator armature 55a but the motor circuits may be individually controlled by normally closed switches 202, 203, which are controlled by coils 202a, 203a in the respective motor circuits. The coils are of such characteristics as to open the switch, whereby to make suitable supplemental resistances effective, whenever the current exceeds a predetermined value in the associated motor circuit. The switches 202, 203, act as safety devices for the respective motors, particularly when the speed of one of the shafts 40, 35 is relatively high and the speed of the other shaft relatively very low or zero, whereby the resistance of the corresponding low speed armature would also be very low and the motor and generator might be damaged by an excess of current. The control exercised by the coils 202a and 203a vibrates the switch of the low resistance motor armature under such conditions, but the relationship is such that subject only to such limitation the motors work together, for the result determined by the tracer control as described for Fig. 5. The two motor armatures of Fig. 5A may also be serially connected with the generator armature, in which case the switches 202, 203 and corresponding resistances are unnecessary. It is to be understood that either mentioned two motor arrangement of Fig. 5A may be used either with the generator current control method of Fig. 5A, later described, or with the current control method described for Fig. 5.

Fig. 5A also shows a modified control of the resistances 59 and 60 which control the generator field current. Where the interconnected restraining devices 100, 101 and torque responsive devices 102, 103 are incorporated in the machine to prevent unbalance of torque resistance in the transmission, as has been described, the acceleration resistance is substantially constant, and a predetermined acceleration rate during the copying control operations may be had by a constant current supply to the motor means. A constant current supply is obtained in Fig. 5A by controlling the switch 61, previously described, by a coil 61aa of suitable characteristics in series with the generator armature circuit. Another coil 62aa which is in shunt with the generator armature circuit, may control switch 62 for inserting resistance 60 in the generator field circuit when the speed of either motor armature reaches a predetermined maximum. At that time the other armature is at low speed but its circuit resistance is high by reason of operation of switch 202 or 203 as above described. It is to be understood that the specific constant current control means of Fig. 5A may be used either with the two motors of Fig. 5A or with the single motor of Fig. 5.

The described control of resistance 60 by the coil 62aa, Fig. 5A, is not intended to replace the control of the same resistance from the switches 52, 53 as previously described, but may be used as supplemental thereto. It is also intended that for either or both of the coils 62aa and 61aa, where these control coils are used, means, not shown, will be provided for altering the characteristics of the coil circuits in accordance with the adjustment of the speed changer 31, similarly to described control of the characteristics for coil 61a of Fig. 5.

Further, as has been mentioned, electronic control means is contemplated, particularly where high speed response is required. Thus electronic tube controls may be used in any suitable well-known manner, either with direct or alternating current power supply, for such control purposes as the control of the field current for the generator 55, Figs. 5, 5A, and as a substitute for various or all of the relays etc. which are shown of electro-magnetic type for purposes of explanation. Various such electronic modifications of the described control devices are contemplated wherever applicable for the described operation and purposes of the machine.

What is claimed is:

1. In a copying machine the combination of two supports relatively movable in mutually transverse paths, transmission mechanism for said support movement including a mechanical differential device comprising three transmission members differentially interconnected within said device for the speed of one of the members to determine the sum of the speeds of the other two members, said other two members being respectively connected for the relative support movement in different of said paths, power operable means for changing the relative speeds of said other two members, and control means for operation of said speed changing means to effect alternative acceleration of the one or the other of said two members including tracer means having elements relatively movable under the control of a pattern to different relative positions respectively determinative of which of said two members will be accelerated.

2. In a copying machine the combination of two supports relatively movable in mutually transverse paths, transmission mechanism for said support movement including a mechanical differential device comprising three transmission members differentially interconnected within said device for the speed of one of the members to determine the sum of the speeds of the other two members, said other two members being respectively connected for the relative support movement in different of said paths, power operable means for changing the relative speeds of said other two members, control means for operation of said speed changing means to effect alternative acceleration of the one or the other of said two members including tracer means having elements relatively movable under the control of a pattern to different relative positions respectively determinative of which of said two members will be accelerated, controller means operable for varying the power supplied for operation of said speed changing means, and means responsive to variations in the rate of speed change effected by said speed changing means and operable for operation of said controller means, said responsive means operating said controller means for effecting a substantially predetermined rate of speed change.

3. In a copying machine the combination of two supports relatively movable in mutually transverse paths, transmission mechanism for said support movement including a mechanical differential device comprising three transmission members differentially interconnected within said device for the speed of one of the members to determine the sum of the speeds of the other two members, said other two members being respectively connected for the relative support movement in different of said paths, a power train for driving said one of the members and including an adjustable rate changer, power operable means for changing the relative speeds of said other two members, control means for operation of said power operable means to effect alternative acceleration of the one or the other of said two members including tracer means having elements relatively movable under the control of a pattern to different relative positions respectively determinative of which of said two members will be accelerated, power controller means operable for varying the power supplied for operation of said relative speed changing means, and means adjustably responsive to variations in the rate of speed change effected by said speed changing means and operable for operation of said controller means, said adjustably responsive means being connected for adjustment in accordance with the positioning of said adjustable rate changer.

4. In a copying machine the combination of two supports relatively movable in mutually transverse paths, transmission mechanism for said support movement including a mechanical differential device comprising three transmission members differentially interconnected for the speed of one of the members to determine the sum of the speeds of the other two members, said other two members being respectively connected for the relative support movement in different of said paths, power operable means for changing the relative speeds of said other two members, control means for operation of said speed changing means to effect alternative acceleration of the one or the other of said two members including tracer means having elements relatively movable under the control of a pattern to different relative positions respectively determinative of which of said two members will be accelerated, and means establishing a substantially predetermined limit of maximum speed for the acceleration of at least one of said two members by said speed changing means.

5. In a copying machine the combination of two supports relatively movable in mutually transverse paths, transmission mechanism for said support movement including a mechanical differential device comprising three transmission members differentially interconnected for the speed of one of the members to determine the sum of the speeds of the other two members, said other two members being respectively connected for the relative support movement in different of said paths, power operable means for changing the relative speeds of said other two members, control means for operation of said speed changing means to effect alternative acceleration of the one or the other of said two members including tracer means having elements relatively movable under the control of a pattern to different relative positions respectively determinative of which of said two members will be accelerated, and means for variably limiting the maximum speed for the acceleration of one of said two members by said speed changing means.

6. In a copying machine the combination of two supports relatively movable in mutually transverse paths, transmission mechanism for said support movement including a mechanical differential device comprising three transmission members differentially interconnected for the speed of one of the members to determine the sum of the speeds of the other two members, said other two members being respectively connected for the relative support movement in different of said paths, power operable means for changing the relative speeds of said other two members, control means for operation of said speed changing means to effect alternative acceleration of the one or the other of said two members including tracer means having elements relatively movable under the control of a pattern to different relative positions respectively determinative of which of said two members will be accelerated, means for variably limiting the maximum speed for the acceleration of one of said two members by said speed changing means, and means for control of said variable limiting means for progressively reducing the maximum speed of the last mentioned member during successive accelerations thereof effected by the pattern controlled positioning of said tracer elements.

7. In a copying machine the combination of two supports relatively movable in mutually transverse paths, transmission mechanism for said support movement including a mechanical differential device comprising three transmission members differentially interconnected for the speed of one of the members to determine the sum of the speeds of the other two members, said other two members being respectively connected for the relative support movement in different of said paths, power operable means for changing the relative speeds of said other two members, control means for operation of said speed changing means to effect alternative acceleration of the one or the other of said two members including tracer means having elements relatively movable under the control of a pattern to different relative positions respectively determinative of which of said two members will be accelerated, controller means operable for varying the power supplied for operation of said relative speed changing means, and means for operation of said controller means to effect a substantial reduction in the power when one of said two transmission members has been accelerated to a substantially predetermined maximum speed.

8. In a copying machine the combination of two supports relatively movable in mutually transverse paths, transmission mechanism for said support movement including a mechanical differential device comprising three transmission members differentially interconnected for the speed of one of the members to determine the sum of the speeds of the other two members, said other two members being respectively connected for the relative support movement in different of said paths, power operable means for changing the relative speeds of said other two members, control means for operation of said speed changing means to effect alternative acceleration of the one or the other of said two members including tracer means having elements relatively movable under the control of a pattern to different relative positions respectively determinative of which of said two members will be accelerated, means for variably limiting the maximum speed for the acceleration of one of said members by said speed changing means, means for control of said variable limiting device for progressively reducing the maximum speed of the last mentioned member during successive accelerations thereof effected by the pattern controlled positioning of said tracer elements, a controller operable for varying the power for operation of said speed changing means, and control means for said controller operable for materially reducing the power at the point of maximum speed determined by said variable speed limiting means.

9. In a copying machine the combination of two supports relatively movable in mutually transverse paths, transmission mechanism for said support movement including a mechanical differential device comprising three transmission members differentially interconnected for the speed of one of the members to determine the sum of the speeds of the other two members, said other two members being respectively connected for the relative support movement in different of said paths, power operable means for changing the relative speeds of said other two members, control means for operation of said speed changing means to effect alternative acceleration of the one or the other of said two members including tracer means having elements relatively movable under the control of a pattern to different relative positions respectively determinative of which of said two members will be accelerated, a restraining device operable for variably restraining the actuation of one of said two members, a device associated with the other of said two members and responsive to variations in the resistance to actuation thereof, and means interconnecting said restraining and responsive devices for effecting a restraint by said restraining device at least in part in accordance to the response of said responsive device.

10. In a copying machine the combination of two supports relatively movable in mutually transverse paths, transmission mechanism for said support movement including a mechanical differential device comprising three transmission members differentially interconnected for the speed of one of the members to determine the sum of the speeds of the other two members, said other two members being respectively connected for the relative support movement in different of said paths, power operable means for changing the relative speeds of said other two members, control means for operation of said speed changing means to effect alternative acceleration of the one or the other of said two members including tracer means having elements relatively movable under the control of a pattern to different relative positions respectively determinative of which of said two members will be accelerated, two restraining devices respectively associated with different of said two members and each operative for variably restraining the actuation of the member with which it is associated, two resistance responsive devices respectively associated with different of said two members and each responsive to variations in the resistance to actuation of the member with which it is associated, and means interconnecting said restraining and responsive devices for the restraint effect of each restraining device to be reduced in accordance with the response of the responsive device associated with the same member, and for the restraint effect of each restraining device to be increased in accordance with the response of the responsive device associated with the other member.

11. In a copying machine the combination of two supports relatively movable in mutually transverse paths, transmission mechanism for said support movement including a mechanical differential device comprising three transmission members differentially interconnected for the speed of one of the members to determine the sum of the speeds of the other two members, said other two members being respectively connected for the relative support movement in different of said paths and differentially driven through said one of the members, power operable means for changing the relative speeds of said other two members, control means for operation of said speed changing means to effect alternative acceleration of the one or the other said two members including tracer means having elements relatively movable under the control of a pattern to different relative positions respectively determinative of which of said two members will be accelerated, and automatic balancing means operatively disposed between said two members for substantially equalizing the driving force applied to the two members from said one of the members irrespective of differences in resistance to the movement of the two supports.

12. In a copying machine the combination of two supports relatively movable in mutually transverse paths, transmission mechanism for said support movement including a mechanical differential device comprising three transmission members differentially interconnected for the speed of one of the members to determine the sum of the speeds of the other two members, said other two members being respectively connected for the relative support movement in different of said paths, said transmission mechanism including reverser means shiftable for reversing the direction of actuation of one of said two supports, power operable means for changing the relative speeds of said two transmission members, tracer means having elements movable under the control of a pattern to a first and second relative position and another relative position, means controlling said reverser means for effecting the opposite directions of said reversible support actuation respectively in said first and second positions of the tracer elements, and means controlling said power means for effecting acceleration of said reversible support in either of said first or second positions of the tracer elements and effecting acceleration of the other of said supports in said other position of the tracer elements.

13. In a copying machine the combination of two supports relatively movable in mutually transverse paths, transmission mechanism for said support movement including a mechanical differential device comprising three transmission members differentially interconnected for the speed of one of the members to determine the sum of the speeds of the other two members, said other two members being respectively connected for the relative support movement in different of said paths, said transmission mechanism including reverser means shiftable for reversing the direction of actuation of one of said two supports, power operable means for changing the relative speeds of said two transmission members, tracer means having elements movable under the control of a pattern to a first and second relative position and a number of different other relative positions, means controlling said reverser means for effecting the opposite direction of said reversible support actuation respectively in said first and second positions of said tracer elements, means controlling said relative speed changing means for effecting acceleration of said reversible support in either of said first or second positions of the tracer elements and effecting acceleration of the other of said supports in several of said other element positions, and supplemental means controlling said relative speed changing means for acceleration of said reversible support in some of said other positions of said tracer elements.

14. In a copying machine the combination of two supports relatively movable in mutually transverse paths, transmission mechanism for said support movement including a mechanical differential device comprising three transmission members differentially interconnected within said device for the speed of one of the members to determine the sum of the speeds of the other two members, said other two members being respectively connected for the relative support movement in different of said paths, power operable means for accelerating the speed of either of said other two members and simultaneously decelerating the speed of the other of the two members, and control means for operation of said power operable means to effect repeated cycles of alternate acceleration of different of said two members including tracer means having elements relatively movable under the control of a pattern to different relative positions respectively determinative of which of said two members will be accelerated.

15. In a copying machine the combination of two supports relatively movable in mutually transverse paths, transmission mechanism for said support movement including a mechanical differential device comprising three transmission members differentially interconnected within said device for the speed of one of the members to determine the sum of the speeds of the other two members, said other two members being respectively connected for the relative support movement in different of said paths, power operable means for accelerating the speed of either of said other two members while simultaneously decelerating the speed of the other of the two members, control means for operation of said power operable means to effect repeated cycles of alternate acceleration of different of said two members including tracer means having elements relatively movable under the control of a pattern to different relative positions respectively determinative of which of said two members will be accelerated, and means for progressively limiting the maximum speed of at least one of said two members during each successive cycle of said alternate member acceleration.

16. In a copying machine the combination of two supports relatively movable in mutually transverse paths, transmission mechanism for said support movement including a mechanical differential device comprising three transmission members differentially interconnected within said device for the speed of one of the members to determine the sum of the speeds of the other two members, said other two members being respectively connected for the relative support movement in different of said paths, power operable means for accelerating the speed of either of said other two members while simultaneously decelerating the speed of the other of the two members, control means for operation of said power operable means to effect repeated cycles of alternate acceleration of different of said two members including tracer means having elements relatively movable under the control of a pattern to different relative positions respectively determinative of which of said two members will be accelerated, means for progressively limiting the maximum speed of at least one of said two members during each successive cycle of said alternate member acceleration, and selector means adjustable for connecting or disconnecting operation of said progressive speed limiting means.

17. In a copying machine the combination of two supports relatively movable in mutually transverse paths, transmission mechanism for said support movement including a mechanical differential device comprising three transmission members differentially interconnected for the speed of one of the members to determine the sum of the speeds of the other two members, said other two members being respectively connected for the relative support movement in different of said paths, power operable means for accelerating the speed of either of said other two members and simultaneously decelerating the speed of the other of the two members, means operable for establishing substantially predetermined maximum and minimum speeds for at least one of said two members, control means for said power means to effect alternative acceleration of said two members including tracer means comprising a stylus movable under the control of a pattern for effecting a change from said minimum to said maximum speed of said one of the two members, and control means operative for effecting a substantially predetermined time lag interval between the start of said stylus movement and the acceleration of the last mentioned member to said maximum speed.

18. In a copying machine the combination of two supports relatively movable in mutually transverse paths, transmission mechanism for said support movement including a mechanical differential device comprising three transmission members differentially interconnected for the speed of one of the members to determine the sum of the speeds of the other two members, said other two members being respectively connected for the relative support movement in different of said paths, power operable means for accelerating the speed of either of said other two members while simultaneously decelerating the speed of the other of the two members, means operable for establishing substantially predetermined maximum and minimum speeds for at least one of said two members, control means for said power means to effect alternative acceleration of said two members including tracer means comprising a stylus movable under the control of a pattern for effecting a change from said minimum to said maximum speed of said one of the two members, and control means operative for effecting a substantially predetermined time lag interval between the start of said stylus movement and the acceleration of the last mentioned member to said maximum speed including means controlling the rate of power supply to said power operable means to effect a substantially predetermined rate of acceleration of said last mentioned member.

19. In a copying machine the combination of two supports relatively movable in mutually transverse paths, transmission mechanism for said support movement including a mechanical differential device comprising three transmission members differentially interconnected for the speed of one of the members to determine the sum of the speeds of the other two members, said other two members being respectively connected for the relative support movement in different of said paths, power operable means for accelerating the speed of either of said other two members while simultaneously decelerating the speed of the other of the two members, means operable for establishing substantially predetermined maximum and minimum speeds for at least one of said two members, control means for said power means to effect alternative acceleration of said two members including tracer means comprising a stylus movable under the control of a pattern for effecting a change from said minimum to said maximum speed of said one of the two members, and means operative for effecting a substantially predetermined time lag interval between the start of said stylus movement and the acceleration of the last mentioned member to said maximum speed including means restraining movement of at least one of said two members at least in part in accordance with the resistance to the support movement from the other member.

20. In a copying machine including a rotary tool and a tracer device comprising a stylus member movable for control of bodily movement of the tool relative to a work piece, the combination of two supports relatively movable in a first path for the traversing of a pattern by said stylus and in a second path for movement of the stylus toward and from the pattern, transmission mechanism for said support movement including a mechanical differential comprising three transmission members differentially interconnected for the speed of one of the members to determine the sum of the speeds of the other two members, said other two members being respectively connected for support movement in different of said paths, driver means for actuating said one of the members, power operable means under the control of said stylus for accelerating the movement of said stylus for accelerating the speed of either of said two members and simultaneously decelerating the speed of the other thereof, means establishing predetermined limits of minimum and maximum speed of at least one of said two members, and means establishing a substantially predetermined time interval for initiating and completing acceleration of the last mentioned member from said minimum to said maximum speed, said stylus having an end surface portion formed on a radius and corresponding to an end surface portion of the tool, the radius of the stylus end portion being larger than the corresponding tool radius by an amount substantially equal to the distance traversed in one of said paths during said predetermined time interval.

21. In a copying machine the combination of two supports relatively movable in mutually transverse paths, transmission mechanism for said support movement including a mechanical differential device comprising three transmission members differentially interconnected within said device for the speed of one of the members to determine the sum of the speeds of the other two members, said other two members being respectively connected for the relative support movement in different of said paths, means for unidirectionally driving said one of said members including a substantially constant speed power source, means for reversibly accelerating the relative speeds of said other two members while they are being driven from said power source, and control means for operation of said accelerating means to effect alternative acceleration of the one or the other of said other two members including tracer means having elements relatively movable under the control of a pattern to different relative positions respectively determinative of which of said two members will be accelerated.

22. A copying machine as recited in claim 21 including control means for said accelerating means and operative for effecting a substantially predetermined rate of acceleration effected thereby.

23. A copying machine as recited in claim 21 in which said accelerating means includes a reversible torque electric motor, and acceleration rate control means for said motor including a control device responsive to variations in rate of change of speed of one of said other two transmission members.

24. In a copying machine the combination of two supports relatively movable in mutually transverse paths, transmission means for said relative support movement, power operable means operable during said movement for alternatively accelerating said support movement in the different paths, control means for operation of said power operable means to effect said alternative acceleration including tracer means having elements relatively movable under the control of a pattern to different relative positions respectively determinative of acceleration in the different paths, and speed control means operatively interconnecting said supports in a manner to maintain the instant sum of the path speeds substantially constant during said alternative acceleration.

25. In a copying machine the combination of two supports relatively movable in mutually transverse line and in-out paths, power operable transmission means for said relative support movement operable for acceleration of the relative rate of support movement in either of said paths, control means for said power operable means including tracer means having elements relatively movable under the control of a pattern surface angularly disposed relative to both said paths of movement for effecting repeated cycles of alternate acceleration and deceleration in said line path, said control means including means operative during said cyclic acceleration and deceleration to maintain average relative relates of movement in each of said paths substantially corresponding to the relative rates required for copying the angle of said pattern by uniform rates of motion in the paths, and speed control means operatively interconnecting said supports in a manner to maintain the instant sum of said average path rates substantially constant during said cyclic acceleration and deceleration.

26. In a copying machine the combination of two supports relatively movable in mutually transverse paths, power operable transmission means for said relative support movement operable for acceleration of the relative rate of support movement in either of said paths, control means for said power operable means including tracer means having elements relatively movable under the control of a pattern surface angularly disposed relative to both said paths of movement for effecting repeated cycles of alternate acceleration in the different paths, control means operative during said cyclic acceleration to maintain average relative rates of movement in said paths substantially corresponding to the relative rates required for copying the pattern angle by uniform rates of motion in the paths, and supplemental control means for said power operable means operative for progressively reducing the maximum speeds of said cyclic acceleration while maintaining said average relative rate.

27. In a copying machine the combination of two supports relatively movable in mutually transverse paths, power operable transmission means for said relative support movement operable for acceleration of the relative rate of support movement in either of said paths, control means for said power operable means including tracer means having elements relatively movable under the control of a pattern surface angularly disposed relative to both said paths of movement for effecting repeated cycles of alternate acceleration in the different paths, power means for said acceleration by said power operable means including means operable for varying the power supplied thereto, and control means for operation of the last mentioned means for maintaining a substantially predetermined rate of acceleration effected by said power operable means.

28. In a copying machine the combination of two supports relatively movable in mutually transverse paths, power operable transmission means for said relative support movement operable for acceleration of the relative rate of support movement in either of said paths, control means for said power operable means including tracer means having elements relatively movable under the control of a pattern surface angularly disposed relative to both said paths of movement for effecting repeated cycles of alternate acceleration in the different paths, power means for said acceleration by said power operable means including means operable for varying the power supplied thereto, and control means for operation of the last mentioned means for maintaining a substantially predetermined rate of acceleration effected by said power operable means, and adjustable for effecting various predetermined rates of said acceleration.

29. In a copying machine the combination of two supports relatively movable in mutually transverse paths, power operable transmission means for said relative support movement operable for acceleration of the relative rate of support movement in either of said paths, control means for said power operable means including tracer means having elements relatively movable under the control of a pattern surface angularly disposed relative to both said paths of movement for effecting repeated cycles of alternate acceleration in the different paths, power means for said acceleration by said power operable means including a controller means operable for varying the power supplied thereto, and control means for operation of said controller means for maintaining a substantially predetermined rate of acceleration effected by said power operable means, the last mentioned control means being adjustable for effecting various predetermined rates of said acceleration, said power operable means including an adjustable rate changer and said last mentioned control means being interconnected for adjustment simultaneously with the adjustment of the rate changer.

30. In a copying machine the combination of two supports relatively movable in mutually transverse paths, transmission means for said relative support movement, power operable means operable for acceleration of the relative rate of support movement in either of said paths, control means for said power operable means including tracer means having elements relatively movable under the control of a pattern surface angularly disposed relative to both said paths of movement for effecting repeated cycles of alternate acceleration in the different paths, speed control means operatively interconnecting said supports in a manner to maintain the instant sum of the support speeds substantially constant during said alternate acceleration, control means adjustable for establishing various maximum speeds in at least one of said paths, and means for progressive adjustment of the last mentioned control means to effect a different maximum speed at each cycle of said alternate acceleration.

31. In a copying machine the combination of two supports relatively movable in mutually transverse paths, power operable transmission means for said relative support movement and operable for changing the relative speed of the path movements, control means for operation of said power operable means to effect alternative relative deceleration of the speed in the one or the other path including tracer means having elements relatively movable under the control of a pattern to different relative positions respectively determinative of which path speed will be decelerated, speed control means operative in a manner to maintain the instant sum of the path speeds substantially constant during the deceleration of the speed of at least one path movement from maximum to minimum speed thereof, and a stylus associated with said tracer means for contacting said pattern whereby to determine the movements of a tool in said paths, said stylus having an end surface portion formed on a radius and corresponding to a similar end portion of the tool, the radius of the stylus end portion being larger than the corresponding tool end portion radius by an amount substantially equal to the distance traversed in the decelerated path during said deceleration from maximum to minimum speed.

32. In a copying machine the combination of two supports relatively movable in mutually transverse paths, power operable transmission means for said relative support movement and operable for changing the relative speeds of the path movements, control means for operation of said power operable means to effect alternative relative acceleration of the speed in the one or the other path including tracer means having elements relatively movable under the control of a pattern to different relative positions respectively determinative of which path speed will be accelerated, control means operable for changing the power supplied for said relative speed change by said power operable means, and means responsive to the rate of speed change effected by said power operable means for operation of the last mentioned control means to maintain a substantially predetermined rate of said acceleration during the acceleration, said rate responsive means being adjustable for changing said predetermined rate.

33. In a copying machine the combination of two supports relatively movable in mutually transverse paths, power operable transmission means for said relative support movement operable for acceleration of the relative rate of support movement in either of said paths, control means for operation of said power operable means to effect alternative relative acceleration of the speed in the one or the other path including tracer means having elements relatively movable under the control of a pattern to different relative positions respectively determinative of which path speed will be accelerated, adjustable means for establishing various limits of maximum path speed for the acceleration effected by said power operable means in at least one of said paths, and control means for said adjustable means for progressively effecting a reduction of the maximum acceleration speed limit during successive accelerations in the last mentioned path.

34. In a copying machine the combination of two supports relatively movable in mutually transverse paths, transmission means for said relative support movement, power operable means for changing the relative speeds of the path movements, control means for operation of said power operable means to effect alternative relative deceleration of the speed in the one or the other path including tracer means having elements relatively movable under the control of a pattern to different relative positions respectively determinative of which path speed will be decelerated, rate changer means adjustable for establishing various limits of maximum path speed, control means operative to effect a predetermined distance traversed in at least one of said paths during deceleration from maximum to minimum path speeds in various adjustments of said rate changer means, and a stylus associated with said tracer means for contacting said pattern whereby to determine the movements of a tool in the said paths, said stylus having an end surface portion formed on a radius and corresponding to a similar end portion of the tool, the radius of the stylus end portion being larger than the similar tool end portion radius by an amount substantially equal to said predetermined distance.

35. In a copying machine the combination of two supports relatively movable in mutually transverse paths, power operable transmission mechanism including two portions respectively for movement in the different paths, control means for changing the relative rates of movement in the different paths including tracer means having elements relatively movable under the control of a pattern; and other control means including two variable restraining mechanisms respectively for the restraint of the different transmission portions, two devices respectively responsive to variations in the resistance to actuation of the different transmission portions, and control means operatively interconnecting said mechanisms and devices for the restraining effect of each restraining mechanism to be varied at least in part in accordance with the response of each responsive device.

36. In a copying machine the combination of two supports relatively movable in mutually transverse paths, power operable transmission mechanism including two portions respectively for movement in the different paths, control means for changing the relative rates of movement in the different paths including tracer means having elements relatively movable under the control of a pattern; and other control means including two variable restraining mechanisms respectively for the restraint of the different transmission portions, two devices respectively responsive to variations in the resistance to actuation of the different transmission portions, and control means operatively interconnecting said mechanisms and devices for the restraint effected by each restraining mechanism to be reduced in accordance with the response of the responsive device associated with the same transmission portion and simultaneously increased in accordance with the response of the responsive device associated with the other transmission portion.

37. In a copying machine the combination of two supports relatively movable in mutually transverse paths, transmission mechanism for said relative support movement including power means for simultaneous support movement in both said paths and power means for change of the relative rate of path movements, control means for the last mentioned power means including a tracer device having elements relatively movable under the control of a pattern surface angularly disposed relative to both said paths for effecting repeated cycles of alternate acceleration in the different paths, speed control means operative to maintain the instant sum of the path speeds substantially constant during said repeated acceleration cycles and control means operative during said cyclic acceleration to maintain average rates of movement in each of said paths corresponding to the rates for copying the angular pattern surface by uniform motion in the two paths.

38. In a copying machine the combination of two supports relatively movable in mutually transverse paths, transmission mechanism for said relative support movement including power means for simultaneous support movement in both said paths and power means for change of the relative rates of path movement, control means for the last mentioned power means including a tracer device having elements relatively movable under the control of a pattern surface angularly disposed relative to both said paths for effecting repeated cycles of alternate acceleration in the different paths, speed control means operative to maintain the instant sum of the path speeds substantially constant during said repeated acceleration cycles and control means operative during said cyclic acceleration to maintain average rates of movement in each of said paths corresponding to the rates for copying the angular pattern surface by uniform motion in the two paths, and supplemental control means operative during said cyclic acceleration for progressively reducing the maximum speeds thereof while maintaining said average rates.

39. In a copying machine the combination of two supports relatively movable in mutually transverse paths, transmission mechanism for said relative support movement including power means for simultaneous support movement in both said paths and power means for change of the relative rates of path movement, control means for the last mentioned power means including a tracer device having elements relatively movable under the control of a pattern surface angularly disposed relative to both said paths for effecting repeated cycles of alternate acceleration in the different paths, speed control means operative to maintain the instant sum of the path speeds substantially constant during said repeated acceleration cycles and control means operative during said cyclic acceleration to maintain average rates of movement in each of said paths corresponding to the rates required for copying the angular pattern surface by uniform motion in the two paths, supplemental control means operative during said cyclic acceleration for progressively reducing the maximum speeds thereof while maintaining said average rates, and control means for selective operative or inoperative adjustment of said supplemental control means.

40. In a copying machine the combination of two supports relatively movable in mutually transverse paths, transmission mechanism for said relative support movement including power means for simultaneous support movement in both said paths and power means for change of the relative rates of path movement, said transmission mechanism including two portions respectively for actuation of said relative support movement in different of said paths, control means for the last mentioned power means including a tracer device having elements relatively movable under the control of a pattern to different relative positions respectively determinative of the acceleration of the rate of movement in the different paths, and means for substantially equalizing the resistance to actuation of said transmission portions including a variable restraining mechanism associated with one of the portions, a device associated with the other portion and responsive to variations in the resistance to actuation thereof and means connecting said restraining mechanism for variation of the restraining effect thereof at least in part in accordance with the response of said responsive device.

41. In a copying machine the combination of two supports relatively movable in mutually transverse paths, transmission mechanism for said relative support movement including power means for simultaneous support movement in both said paths and power means for change of the relative rates of path movement, said transmission mechanism including two portions respectively for actuation of said relative support movement in different of said paths, control means for the last mentioned power means including a tracer device having elements relatively movable under the control of a pattern surface angularly disposed relative to both said paths for effecting repeated cycles of alternate acceleration in the different paths, and means for substantially equalizing the resistance to actuation of said transmission portions including a variable restraining mechanism associated with one of the portions, a device associated with the other portion and responsive to variations in the resistance to actuation thereof, and means connecting said restraining mechanism for variation of the restraining effect thereof at least in part in accordance with the response of said responsive device.

42. In a copying machine the combination of two supports relatively movable in mutually transverse paths, transmission mechanism for said relative support movement including power means for simultaneous support movement in both said paths and power means for change of the relative rates of path movement, control means for the last mentioned power means including a tracer device having elements relatively movable under the control of a pattern to different relative positions respectively determinative of acceleration of the rate of movement in the different paths, control means for said transmission mechanism for maintaining the sum of the speeds of said path movements substantially constant whereby the one path movement is decelerated whenever the other is accelerated, and a stylus associated with said tracer device for contacting said pattern whereby to determine the movements of a tool in said paths, said stylus having an end surface portion formed on a radius and corresponding to a similar end portion of the tool, the radius of the stylus end portion being larger than the corresponding tool end portion radius by an amount substantially equal to the distance traversed in one of said path movements during deceleration from maximum to minimum speed thereof.

43. In a copying machine the combination of two supports relatively movable in mutually transverse paths, transmission mechanism for said relative support movement including power means for simultaneous support movement in both said paths and power means for change of the relative rates of path movement, control means for the last mentioned power means including a tracer device having elements relatively movable under the control of a pattern surface angularly disposed relative to both said paths for effecting repeated cycles of alternate acceleration in the different paths, control means for said transmission mechanism for maintaining the sum of the speeds of said path movements substantially constant during said cyclic movements whereby the one path movement is decelerated whenever the other is accelerated, and a stylus associated with said tracer device for contacting said pattern whereby to determine the movements of a tool in said paths, said stylus having an end surface portion formed on a radius and corresponding to a similar end portion of the tool, the radius of the stylus end portion being larger than the corresponding tool end portion radius by an amount substantially equal to the distance traversed in one of said path movements during deceleration from maximum to minimum speed thereof.

44. In a copying machine the combination of two supports relatively movable in a first path for tool movement toward and from a work piece and in another path, transmission mechanism for said relative support movement in both said paths, control means for said transmission including a tracer device having elements relatively movable under the control of a pattern to relative positions determinative of movement toward and from the work piece respectively and to several other relative positions, speed control means operative to maintain the instant sum of the path speeds substantially constant said tracer device including supplemental control means for effecting said movement toward the work piece while said elements are in some of said other relative positions.

45. In a copying machine the combination of two supports relatively movable in a first path for tool movement toward and from a work piece and in another path, transmission mechanism for said relative support movement in both said paths, control means for said transmission including a tracer device having elements relatively movable under the control of a pattern to relative positions determinative of said path movement toward and from the work piece respectively and to several other relative positions, speed control means operative to maintain the instant sum of the path speeds substantially constant said tracer device including supplemental control means for effecting said movement toward the work piece while said elements are in some of said other relative positions, and control means rendering said supplemental control means inoperative except during a predetermined rate of said other path movement.

46. In a copying machine the combination of two supports relatively movable in a first path for tool movement toward and from a work piece and in another path, transmission mechanism for said relative support movement in both said paths, control means for said transmission including a tracer device having elements relatively movable under the control of a pattern to relative positions determinative of said path movement toward and from the work piece respectively and to several other relative positions, speed control means operative to maintain the instant sum of the path speeds substantially constant said tracer device including supplemental control means for effecting said movement toward the work piece while said elements are in some of said other relative positions, and control means rendering said supplemental control means inoperative when said elements are in said position for effecting movement in direction away from said work piece.

47. In a copying machine the combination of two supports relatively movable in a first path in opposite directions respectively for relative movement of a tool and work piece toward and from one another and in a second path for relatively traversing the work piece and tool, power operable transmission mechanism for said relative support movements, and control means for said power operable means including tracer means having elements relatively movable under the control of a pattern through various intermediate positions to toward and from positions respectively for effecting said toward and from directions of path movement, speed control means operative to maintain the instant sum of the path speeds substantially constant said tracer means including supplemental means operative only under certain conditions of operation of said transmission mechanism for effecting said toward direction of path movement in some of said intermediate positions.

48. In a copying machine including a tracer device comprising a frame and a stylus member relatively movable for the control of bodily movement of a tool relative to a work piece whereby to copy a pattern, the combination of two supports relatively movable in a first path for the traversing of said pattern by said stylus and in a second path for movement of the stylus toward or from the pattern, power operable transmission means under the control of said stylus movements for effecting cyclic alternate acceleration and deceleration of said support movement in at least said second path while the support movement in said first path effects said traversing on an angular surface of the pattern, the simultaneous acceleration in the one path and traversing movement in the other path operating to effect a curved path of said relative tool and work movement during the acceleration in said one path, said stylus having a pattern-contacting surface oversize with respect to the size of said tool to effect contact of the stylus with points on the angular pattern surface in advance of the tool contact with the corresponding points on the copied surface of the work piece, the effective form of said oversize pattern-contacting stylus surface substantially corresponding to said curved path whereby to effect substantially the same result for various angles of the pattern surface whenever the curve of the path remains the same.

49. In a copying machine the combination of two supports relatively movable in mutually transverse paths, power operable transmission mechanism for said support movement, speed control means operative to maintain the instant sum of the path speeds substantially constant and control means for said power operable means including a tracer device operable for effecting support movement substantially exclusively in one of said paths under the control of a pattern surface extended in a direction parallel with the last mentioned path, said tracer device including elements relatively movable under the control of the pattern surface between positions at predetermined spacing and respectively determinative of corrective support movements in opposite directions in the other of said paths, said tracer device also including supplemental means operative for effecting said opposite direction of support movement at materially reduced spacing of said relative element positions.

50. In a tracer controlled milling machine, a work supporting structure, a cutting tool supporting structure, means for effecting line movement between said work support and said tool support, means for effecting in and out movement between said work support and said tool support, a differential mechanism, a source of power operatively connected to drive one element of said differential mechanism, transmission means connecting a second element of said differential mechanism to said supports for effecting line movement, transmission means connecting a third element of said differential mechanism to said supports for effecting in or out movement, tracer mechanism arranged to cooperate with a pattern to be copied by said machine, means responsive to said tracer mechanism and operative to apply torque to one of said transmission means in a manner to proportion the ratio of line movement to in or out movement in accordance with the requirements of the pattern being copied, and reversing mechanism responsive to said tracer mechanism and operative to provide for either in or out movement of said supports by power from said differential as may be required by said pattern.

51. In a copying machine, the combination of two supports relatively movable in a first path for tool movement toward and away from a work piece and in another path, transmission mechanism for said relative support movement in both said paths, control means for said transmission mechanism including a tracer device having elements relatively movable under the control of a pattern to spaced relative positions respectively determinative of said movement toward and from the work piece in said first path, said elements having various relative positions intermediate said spaced positions and normally ineffective for either movement in said first path, said tracer device including supplemental control means for effecting said movement toward the work piece while said elements are in some of said intermediate positions, and means preventing operation of said supplemental control means except when the support movement in said other path is of high speed relative to the movement in the first path.

52. In a copying machine, the combination of two supports relatively movable in a first path for tool movement toward and away from a work piece and in another path, transmission mechanism for said relative support movement in both said paths, control means for said transmission mechanism including a tracer device having elements relatively movable under the control of a pattern to spaced relative positions respectively effective for said movement toward and from the work piece in said first path, said elements having various relative positions intermediate said spaced positions and normally ineffective for either movement in said first path, said tracer device including supplemental control means for effecting said movement toward the work piece while said elements are in some of said intermediate positions, and means preventing operation of said supplemental control means when said elements are in a relative position effective for said movement away from the work piece.

FRED A. PARSONS.